(12) United States Patent
Ueda et al.

(10) Patent No.: US 7,447,164 B2
(45) Date of Patent: Nov. 4, 2008

(54) COMMUNICATION APPARATUS, TRANSMISSION APPARATUS AND RECEPTION APPARATUS

(75) Inventors: Satoshi Ueda, Tokyo (JP); Hideki Yoshida, Kanagawa (JP)

(73) Assignee: Sony Corporation (JP)

( * ) Notice: Subject to any disclaimer, the term of this patent is extended or adjusted under 35 U.S.C. 154(b) by 831 days.

(21) Appl. No.: 10/717,631

(22) Filed: Nov. 21, 2003

(65) Prior Publication Data
US 2004/0190459 A1 Sep. 30, 2004

(30) Foreign Application Priority Data
Nov. 28, 2002 (JP) .......................... P2002-345902

(51) Int. Cl.
*H04L 1/00* (2006.01)
(52) U.S. Cl. ................. 370/252; 370/412; 370/429; 370/509
(58) Field of Classification Search .......... 370/229, 370/230, 252–253, 503–516, 525, 412–417, 370/428–429
See application file for complete search history.

(56) References Cited

U.S. PATENT DOCUMENTS

| | | | | |
|---|---|---|---|---|
| 5,926,458 | A * | 7/1999 | Yin | 370/230 |
| 6,507,592 | B1 * | 1/2003 | Hurvig et al. | 370/503 |
| 6,510,150 | B1 * | 1/2003 | Ngo | 370/347 |
| 6,868,069 | B2 * | 3/2005 | Knobbe et al. | 370/252 |
| 6,975,655 | B2 * | 12/2005 | Fischer et al. | 370/516 |
| 2002/0064224 | A1 * | 5/2002 | Hata et al. | 375/240.01 |

OTHER PUBLICATIONS

Schulzrinne et al., "RTP: A Transport Protocol for Real-Time Applications," RFC 1889 (Jan. 1996), available at <ftp://ftp.rfc-editor.org/in-notes/rfc1889.txt>.
Schulzrinne et al., "RTP: A Transport Protocol for Real-Time Applications," RFC 3550 (Jul. 2003), available at <ftp://ftp.rfc-editor.org/in-notes/std/std64.txt>.

* cited by examiner

*Primary Examiner*—Ricky Ngo
*Assistant Examiner*—Pao Sinkantarakorn
(74) *Attorney, Agent, or Firm*—Rader Fishman & Grauer PLLC; Ronald P. Kananen

(57) ABSTRACT

Upon reception of a transport stream of information data from an encoder, an RTP transmission process unit employed in an RTP process circuit is activated to packetize the transport stream in an RTP packet. A network device then outputs the resulting RTP packet to a network. At that time, sender information for the transmission is created and stored. On the other hand, an RTP reception process unit employed in the RTP process circuit depacketizes an RTP packet received from the network through the network device to obtain a transport stream and supplies the transport stream to a decoder. At that time, receiver information for the reception is created and stored. An RTCP process means employed in a control unit on the host side acquires the sender information and the receiver information through an internal bus and uses them to create an RTCP packet to be output to the network by way of the network device. As a result, the streaming quality can be assured independently of the state of the control unit on the host side.

13 Claims, 25 Drawing Sheets

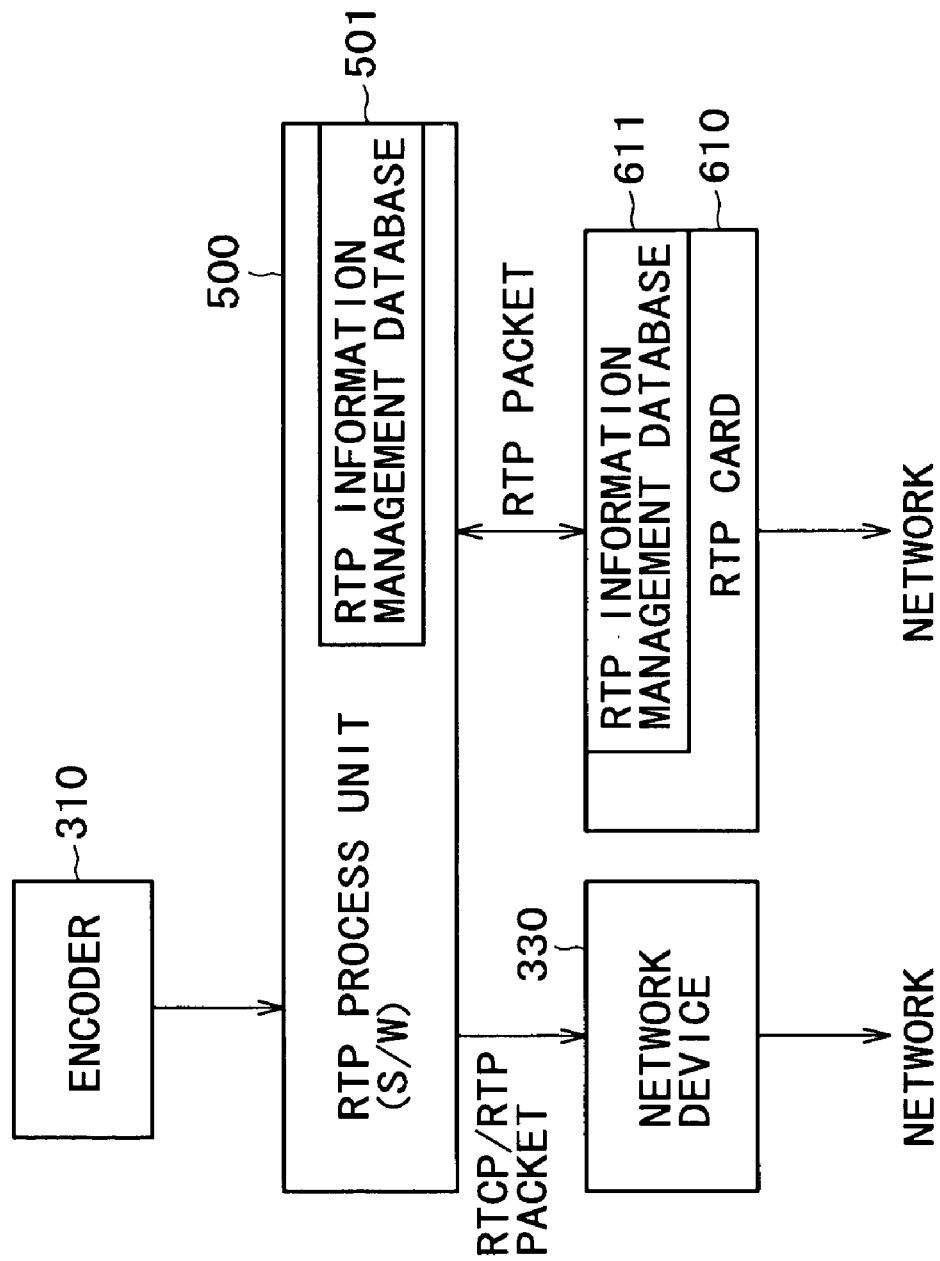

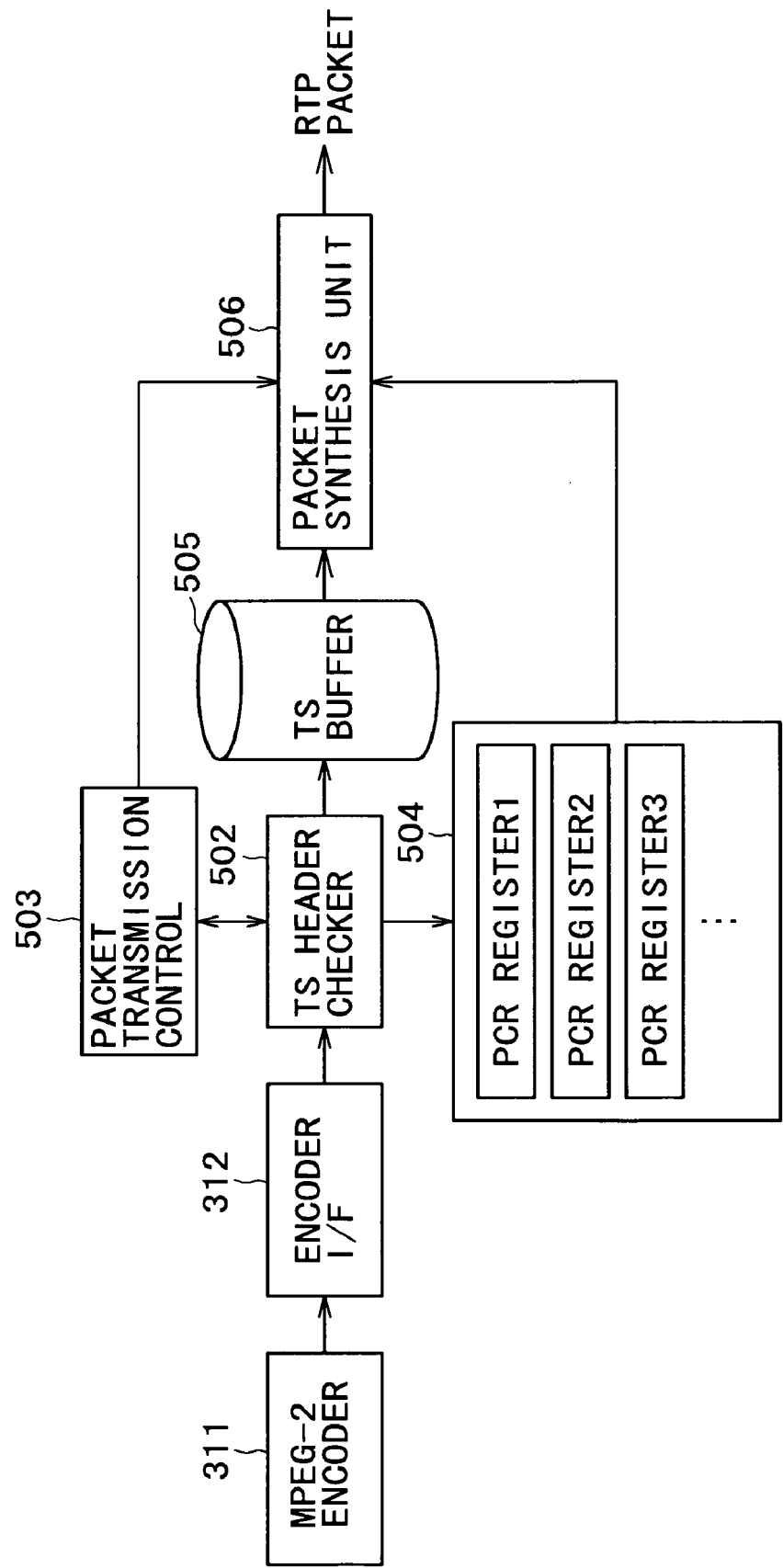

COMMUNICATION APPARATUS, TRANSMISSION APPARATUS AND RECEPTION APPARATUS

BACKGROUND OF THE INVENTION

The present invention relates to a communication apparatus, a transmission apparatus and a reception apparatus. More particularly, the present invention relates to a communication apparatus, a transmission apparatus and a reception apparatus, which are used for transmitting and receiving streaming data to and from a network.

In the past, some transmission protocols were proposed suitable for transferring video data including moving-picture data, audio data and auxiliary data to a destination by way of a network and streaming to reproduce the data in a real-time manner. The RFC 1889 has recommended an RTP (Real-time Transport Protocol), which is one of the proposed transmission protocols, as a transport protocol for realizing a real-time transport application for transmitting/receiving sounds and moving pictures in a real-time manner by way of an IP network such as the Internet.

In general, the RTP is adopted in conjunction with an RTCP (Real-time Transport Control Protocol) for controlling the RTP on a UDP (User Datagram Protocol), which is a connectionless protocol. While the RTP is a protocol for transmitting sound and moving-picture data, the RTCP is a protocol for implementing a function to check information such as a transmission delay and line quality as well as a function to notify an application adopting the RTP of the information. For example, an RTCP packet transmitted by a sender transferring RTP data includes an SR (Sender Report) including a timestamp and the number of transmitted RTP packets and an RR (Receiver Report). On the other hand, an RTCP packet transmitted by a receiver of RTP data includes an RR including an RTP loss factor, the number of lost RTP packets and an average value of jitters of arrival-time gaps. For this reason, it is necessary for the transmitter of RTP data to manage sender information and receiver information. The sender information includes the number of RTP packets transmitted in the transmission of the RTP data. On the other hand, the receiver information includes the number of RTP packets lost in the reception of the RTP data.

Since it is necessary to manage these pieces of information, traditionally, RTP/RTCP communications are implemented by carrying out software processing by using a process in a host such as a personal computer.

In addition, in order to process data at an even higher speed, processing to packetize and depacketize data by RTP is carried out by using an external apparatus instead of executing a process in the host. An example of such an external apparatus is data communication hardware connected to a PCI bus. For details, refer to patent reference 1 or other documents.

FIG. 24 is a diagram showing the configuration of the conventional communication apparatus. The communication apparatus shown in the figure is explained as an apparatus on the transmission side. In the conventional communication apparatus, data generated by an encoder 310 is packetized by an RTP process unit 500, and a network device 330 transmits the packet to an apparatus on the reception side. The processing function of the RTP process unit 500 is implemented by software. To be more specific, a control unit such as a CPU executes a program of the software. In order to transmit an RTP packet to an apparatus on the reception side, sender information is recorded in an RTP information management database 501 in advance. As a time to transmit the RTCP packet to an apparatus on the reception side is reached, the RTCP packet is generated on the basis of the sender information, and the network device 330 transmits the RTCP packet.

A communication apparatus disclosed in patent reference 1 is further connected to an RTP card 610, which carries out transmissions and receptions of RTP packets by using hardware. The RTP process unit 500 forms a judgment as to whether the RTP process unit 500 or the RTP card 610 is to transmit an RTP packet to an apparatus on the reception side. If the RTP process unit 500 is determined to be the unit to transmit an RTP packet, the procedure described above is followed. If the RTP card 610 is determined to be the unit to transmit an RTP packet, on the other hand, the RTP packet is transmitted by updating an RTP information management database 611 of the RTP card 610 in advance. As a time to transmit the RTCP packet to an apparatus on the reception side is reached, the contents of the RTP information management database 611 are copied to the RTP information management database 501 of the host and the RTCP packet is generated on the basis of information acquired from the RTP information management database 501. Then, the RTP card 610 transmits the RTCP packet to an apparatus on the reception side. In processing to receive an RTCP packet, data is extracted from the RTCP packet along a route opposite to the transmission process described above.

Next, the RTP process unit 500 is explained in detail. FIG. 25 is a diagram showing the configuration of the RTP process unit 500 employed in the conventional communication apparatus.

In this case, in accordance with the RFC 2250, an RTP packet having an MPEG-2 transport stream (referred to hereafter simply as an MPEG2-TS) as a payload is required to include an RTP timestamp field in the RTP header having a value synchronized to the data stored in a PCR (Program Clock Reference) field of a TS packet, which is enclosed in the RTP packet as a portion of the RTP payload.

In the RTP process unit 500, when a TS packet generated by an MPEG-2 encoder 311 is supplied to an encoder interface (I/F) 312, the TS packet is passed on to a TS header checker 502, which checks the header of the TS packet to detect a PCR field. The TS header checker 502 stores the detected PCR field in PCR registers 504 and temporarily stores the TS packet in a TS buffer 505. A packet transmission control unit 503 manages information such as the number of input TS packets. As conditions for a packet transmission are all satisfied, the packet transmission control unit 503 issues a request for a transmission of an RTP packet to a packet synthesis unit 506. At this request, the packet synthesis unit 506 generates a timestamp from the value of the PCR field stored in the PCR registers 504. The packet synthesis unit 506 also generates the RTP packet including an RTP payload and an RTP header. The RTP payload includes the TS packets stored in the TS buffer 505 and the RTP header includes the generated timestamp in the RTP timestamp field of the RTP header.

Patent reference 1: Japanese Patent Laid-open No. 2001-320407

However, the conventional communication apparatus has a problem in that it is difficult to maintain a streaming quality for some states of the conventional communication apparatus serving as a host. In addition, the conventional communication apparatus has another problem in that it is hard to make the scale of the circuit compact in order to maintain a predetermined streaming quality.

As shown in FIG. 24, in the conventional communication apparatus, a control unit in the communication apparatus serving as a host carries out the processing to packetize and depacketize data in and from an RTCP/RTP packet by execution of software. Even if the RTP card 610 for carrying out the RTP processing is employed as an additional unit, the control unit in the host forms a judgment as to whether the RTP processing is to be carried out by using the software or the hardware.

For the reason described above, in dependence on the processing state of the host or the condition of the network, it may be impossible to assure sufficient precision for a measured packet arrival time or for a determined timing to pass real-time data to a protocol at a higher level. In general, in measuring time by using software, the arrival of a packet interrupts the host, which then carries out an interrupt-handling process to measure a time. However, an interrupt latency (defined as a period of time between the generation of an interrupt signal and the implementation of the interrupt-handling process) of the host varies in dependence on the processing state of the host. In a reception process, the arrival time of a packet must be measured at the precision of an RTP timestamp. By the same token, the timing to pass real-time data to a protocol at a higher level must be determined also at the precision of an RTP timestamp. In the case of an MPEG2-TS serving as an object of processing, a resolution of 90 KHz (or about 11.11 microseconds) is required. Thus, if the reception process is entirely carried out by using software, in some cases, sufficient precision cannot be assured because of reasons such as the fact that the measured time and the determined timing lag behind their respective correct values.

If the measured arrival time has a lack of precision, it is impossible to estimate a QoS (Quality of Service) on the network with a high degree of accuracy. Thus, information cannot be reported correctly. As a result, the condition of the network cannot be improved on the basis of the incorrectly reported information.

In addition, a communication apparatus on the reception side controls a timing to pass data extracted from an RTP packet to a protocol at a higher level by referring to an RTP timestamp set by the communication apparatus on the transmission side in the header of the RTP packet. To put it in detail, the data is temporarily stored in the buffer and then passed to a protocol at a higher level as soon as the time obtained as a result of adding jitters to an RTP timestamp of the RTP packet is reached. For this reason, it is necessary to synchronize a timer employed in the communication apparatus on the transmission side to a timer employed in the communication apparatus on the reception side. As described above, however, it is impossible to assure sufficient precision for timings determined by the communication apparatus on the transmission and reception sides. Thus, a problem is raised in that it is difficult to synchronize the timer employed in the communication apparatus on the transmission side to the timer employed in the communication apparatus on the reception side. Assume for example that the timer employed in the communication apparatus on the transmission side is proceeding in a manner lagging behind the timer employed in the communication apparatus on the reception side. In this case, the speed to pass data extracted from RTP packets to a protocol at a higher level is low with respect to the speed at which the RTP packets are received. As a result, an overflow occurs in a buffer for temporarily storing the data.

Thus, if the measured arrival time has a lack of precision or if the timer for setting an RTP timestamp in the communication apparatus on the transmission side is not synchronized to the timer for interpreting the same RTP timestamp in the communication apparatus on the reception side as described above, it is impossible to set the timing to pass data to a protocol at a higher level with a high degree of accuracy. Assume for example that the protocol at the higher level is a decoder. In this case, a reproduction timing of the decoder will be greatly affected by the timing to pass data from the RTP process unit 500 to the decoder unless a buffer employed in the decoder has a sufficiently large size. The quality of the reproduction result of the stream data will be greatly affected as well. In order to solve this problem, it is necessary to provide a margin to the size of the buffer employed in the decoder. In this case, however, the circuit will be inevitably designed in a wasteful manner.

On the other hand, in order to synchronize the RTP timestamp to the value stored in the PCR field of a TS packet received from a protocol at the higher level in the apparatus on the transmission side, the TS packet is stored in the TS buffer 505 and the value stored in the PCR field is managed by using the PCR registers 504. Therefore, the number of TS packets managed in the TS buffer 505 is limited to the number of PCR registers employed in the PCR registers 504. Since a ratio of the number of TS packets each including a PCR field to the amount of data passed by the protocol at the higher level is dependent on the condition of the protocol at the higher level, it is difficult to estimate the ratio at the design stage. It is therefore necessary to provide a margin to the design of the PCR registers 504 and the TS buffer 505. In consequence, the circuit will be unavoidably designed in a wasteful manner.

SUMMARY OF THE INVENTION

It is thus an object of the present invention, addressing the problems described above, to provide a communication apparatus capable of maintaining a high streaming quality without regard to the processing state of the control unit employed in the host. It is another object of the present invention to provide a communication apparatus allowing the scale of the circuit to be reduced.

According to the first aspect of the present invention, a communication apparatus is provided having a network device connected to a network to be used for outputting and receiving packets to and from the network, the communication apparatus including:

time measurement means for measuring a time on the basis of a clock signal having a predetermined frequency;

transmission process means for receiving information data from an application at a higher level, packetizing the information data, outputting the packet to the network by way of the network device and saving sender information including a transmission time of the packet;

reception process means for receiving a predetermined packet from the network by way of the network device, generating receiver information including an arrival time of the packet by using the time measurement means, saving the receiver information, depacketizing the packet to obtain predetermined information data and outputting the predetermined information data to an application at a higher level; and data control means for controlling flows of the information data.

According to the second aspect of the present invention, a transmission apparatus is provided having a network device connected to a network to be used for outputting a packet to the network, the transmission apparatus including:

transmission process means for receiving information data from an application at a higher level, packetizing the information data, outputting the packet to the network by way of the network device and saving sender information showing conditions at a transmission time of the packet; and data control means for controlling a flow of the information data.

According to the third aspect of the present invention, a transmission apparatus is provided having a network device connected to a network to be used for outputting a packet to the network, the transmission apparatus including:

payload storage means for temporarily storing information data received from an application at a higher level as a payload of the packet;

determination means for determining whether or not the information data received from the application at a higher level includes predetermined attached information to be attached to the packet;

attached-information storage means for extracting the attached information from the information data received from the application at a higher level and temporarily keeping the attached information if the determination means determines that the information data received from the application at a higher level includes the attached information;

control means for allocating an area in the payload storage means as an area to be used for storing the attached information if the determination means determines that the information data received from the application at a higher level includes the attached information; and attached-information write means for writing the attached information kept temporarily in the attached-information storage means into the area allocated by the control means as an area to be used for storing the attached information.

According to the fourth aspect of the present invention, a reception apparatus is provided having a network device connected to a network to be used for receiving a packet from the network, the reception apparatus including:

time measurement means for measuring a time on the basis of a clock signal having a predetermined frequency;

reception process means for receiving a predetermined packet from the network by way of the network device, generating receiver information including an arrival time of the packet by using the time measurement means, saving the receiver information, depacketizing the packet to obtain predetermined information data and outputting the predetermined information data to an application at a higher level; and data control means for controlling a flow of the information data.

In the communication apparatus described above, the data control means controls flows of the information data.

In a transmission process, the data control means passes information data received typically from an encoder serving as an application at a higher level to the transmission process means. When receiving information data to be transmitted, the transmission process means packetizes the information data, and transmits the packet to the network by way of the network device. At that time, the transmission process means generates and saves sender information including a transmission time of the packet.

When receiving a packet from the network by way of the network device, the reception process means uses the time measurement means to generate receiver information including an arrival time of the packet and saves the receiver information. In addition, the reception process means depacketize the packet to obtain information data and then transfers the information data to typically a decoder serving as an application at a higher level.

The transmission apparatus described above generates a packet on the basis of predetermined attached information included in information data received from the application at a higher level. The information data is kept in the payload storage means as a payload till a predetermined condition is satisfied. The detection means determines whether or not the information data received from the application at a higher level includes predetermined attached information to be attached to the packet. If the detection means determines that the information data received from the application at a higher level includes predetermined attached information to be attached to the packet, the attached-information storage means extracts the attached information from the information data and temporarily keeps the attached information, whereas the control means allocates an area in the payload storage means as an area to be used for storing the attached information. In the payload storage means, the allocated area precedes an area used for keeping the information data. Then, the attached-information storage means copies the attached information kept temporarily in the attached-information storage means to the area allocated by the control means after an operation to store the information data is completed.

The communication apparatus provided by the present invention may include a transmission process means for packetizing information data, a reception process means for depacketizing a packet to obtain information data and an apparatus control unit for controlling flows of information data. The transmission process means and the reception process means are capable of carrying out communication processing independently of the condition of a load borne by the apparatus control unit so that it is possible to assure precision in measurement of a network condition and in determination of timing. Thus, the streaming quality can be kept at a predetermined level. In addition, since the streaming quality can be assured, a design margin can be reduced to a required minimum so that the scale of the circuit can be made compact. Moreover, it is also possible to decrease the processing load borne by the apparatus control unit, which is a unit on the host side.

In the conventional transmission apparatus, payloads are managed by using a storage area while data other than the payloads are managed by using registers. With the transmission apparatus provided by the present invention, however, it is possible to manage both the payloads and the other data by using a memory common to the payloads and the other data. Thus, the registers can be eliminated and the scale of the circuit can, hence, be made compact.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 24 is a diagram showing the configuration of the conventional communication apparatus; and FIG. 25 is a diagram showing the configuration of an RTP process unit employed in the conventional communication apparatus.

DETAILED DESCRIPTION OF THE PREFERRED EMBODIMENTS

Preferred embodiments of the invention are explained by referring to the diagrams as follows.

First of all, the entire communication apparatus implemented by a specific one of the embodiments is explained before describing details of the specific embodiment in concrete terms.

Figure 1:
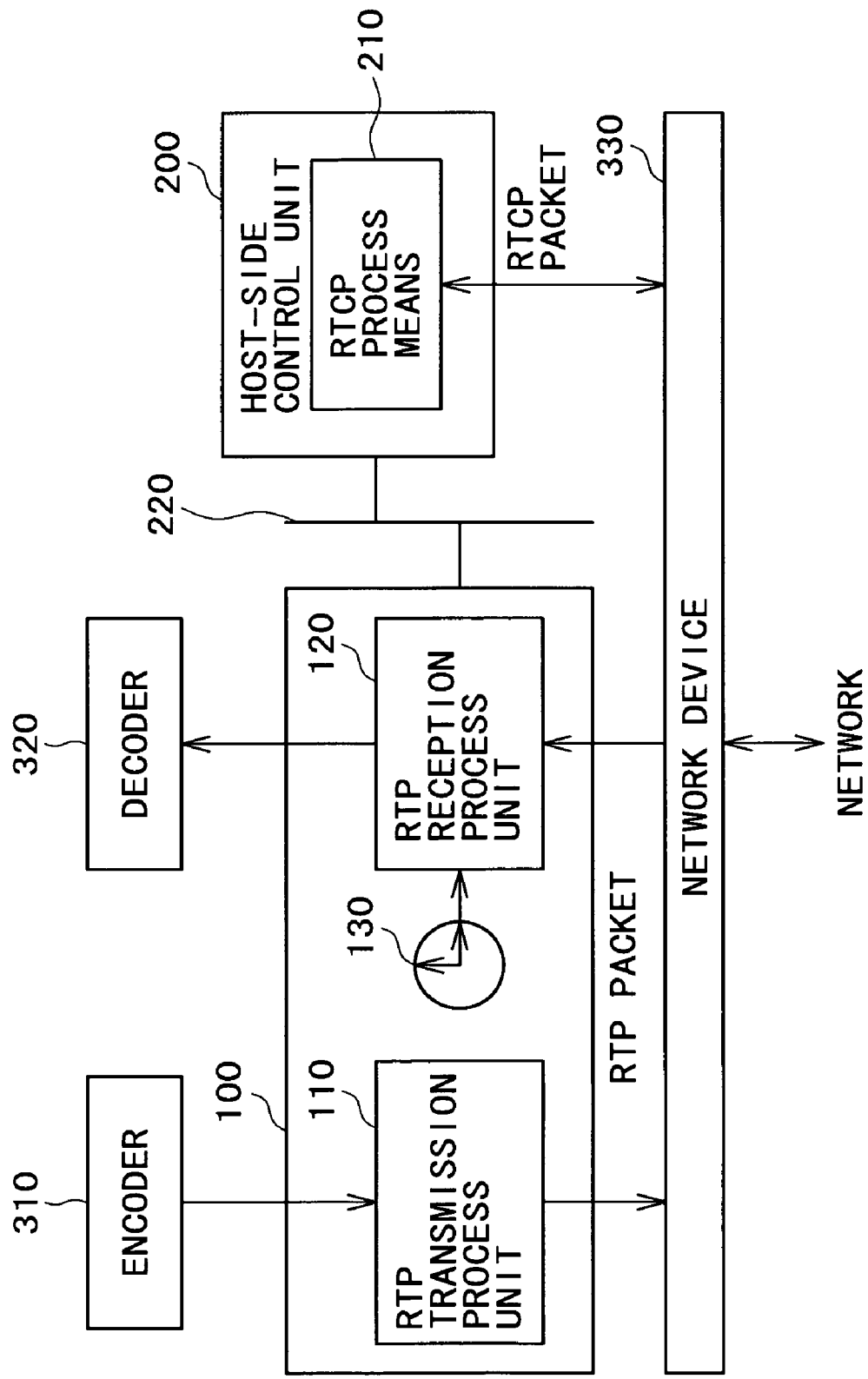
FIG. 1 is a diagram showing the configuration of a communication apparatus implemented by an embodiment of the present invention.

FIG. 1 is a diagram showing the configuration of a communication apparatus implemented by an embodiment of the present invention. The present invention is applied, for example, to a communication apparatus of a communication system for transferring a stream of video data by adopting the RTP/RTCP.

The communication apparatus provided by the present invention includes an RTP process circuit 100, a host-side control unit 200, an encoder 310, a decoder 320 and a network device 330. Connected to the encoder 310 for encoding video data and the decoder 320 for decoding encoded video data, is a component, within the RTP process circuit 100, for packetizing video data in an RTP packet and depacketizing a packet to obtain video data from an RTP packet. Used for controlling the entire communication apparatus, the host-side control unit 200 includes an RTCP process means 210 for managing information generated by the RTP process circuit 100 and creating, transmitting as well as receiving an RTCP packet. Connected to a network, the network device 330 is a component for carrying out processing to transmit and receive an RTP packet.

The RTP process circuit 100 is hardware including an RTP transmission process unit 110 for transmitting an RTP packet, an RTP reception process unit 120 for receiving an RTP packet and a timer 130 for measuring time.

The RTP transmission process unit 110 carries out a packetize process to generate an RTP packet by adding an RTP header to a transport stream received from the encoder 310. The generated RTP packet is delivered to the network device 330 for transmitting the packet to the network. An RTP header includes an RTP timestamp and an RTP sequence number, and so forth. The number of transmitted RTP packets and the number of transmitted RTP bytes and the like are stored as sender information.

On the other hand, the RTP reception process unit 120 checks/processes the RTP header of an RTP packet received from the network device 330 and carries out a depacketize process to extract a payload from the RTP packet. The payload depacketized from the RTP packet is output to the decoder 320. At that time, the timer 130 is used for measuring an arrival time and jitters of arrival times are computed. Then, receiver information including information on jitters of arrival times, the number of received RTP packets and the number of lost RTP packets is stored.

The timer 130 generates a clock signal with a frequency required for transmission of video data. Typically, the original frequency is higher than the eventually required frequency. Thus, the original frequency is divided by using a frequency divider such as a programmable counter to generate the required frequency.

Connected to the RTP process circuit 100 by an internal bus 220, the host-side control unit 200 controls the communication apparatus as a whole and includes an RTCP process means 210 for carrying out an RTCP process.

The RTCP process means 210 is a management-packet process means for transmitting and receiving an RTCP packet, which is a management packet representing the condition of the network. When a predetermined RTCP transmission time is reached, the RTCP process means 210 fetches sender information and receiver information from the RTP process circuit 100 through the internal bus 220, and generates an RTCP packet based on these pieces of information. The RTCP process means 210 then supplies the RTCP packet to the network device 330 for transmitting the packet to the network. The RTCP process means 210 also receives and analyzes an RTCP packet from the network device 330. The RTCP process means 210 is implemented by software.

The encoder 310 and the decoder 320 are each an application at a level higher than the RTP process circuit 100. The encoder 310 is a member for encoding information such as video data received from a real-time data output unit not shown in the figure. On the other hand, the decoder 320 is a member for decoding information such as video data to be output to a real-time data input unit also not shown in the figure. The encoder 310 encodes input real-time data received from the real-time data output unit, converting the data into a transport stream output to the RTP process circuit 100, which uses the stream as the payload of an RTP packet. On the other hand, the decoder 320 decodes a transport stream received from the RTP process circuit 100 and outputs real-time data obtained as a result of decoding to the real-time data input unit.

The network device 330 is a lower level application compared to the RTP process circuit 100 and the RTP process means 210. The network device 330 carries out processing to transmit and receive RTP as well as RTCP packets.

The operation of the communication apparatus having such a configuration is explained as follows.

When a transport stream generated by the encoder 310 is supplied to the RTP process circuit 100, the RTP transmission process unit 110 is activated. The RTP transmission process unit 110 creates an RTP packet by adding an RTP header to the transport stream and supplies the RTP packet to the network device 330. At that time, sender information is generated and stored in the RTP transmission process unit 110.

When an RTP packet is supplied to the RTP reception process unit 120 from the network device 330, the RTP reception process unit 120 is activated to check and process the RTP header of the RTP packet. Then, the RTP reception process unit 120 extracts the payload from the RTP packet and supplies the payload to the decoder 320. At that time, receiver information is generated and stored in the RTP reception process unit 120.

When an RTCP transmission time is reached, the host-side control unit 200 activates the RTCP process means 210. The RTCP process means 210 then fetches sender information and receiver information from the RTP process circuit 100 through the internal bus 220, and generates a sender report and a receiver report based on these pieces of information for an RTCP packet. Then, the RTCP process means 210 adds the sender and receiver reports to the RTCP packet, which is finally output to the network by way of the network device 330.

On the other hand, when an RTCP packet is received from the network by way of the network device 330, the host-side control unit 200 acquires a sender report and a receiver report from the RTCP packet and analyzes the reports. A result of the analysis is used for improving the condition of the network.

The following description explains the configurations of the RTP transmission process unit 110 and the RTP reception process unit 120, which are employed in the RTP process circuit 100.

Figure 2:
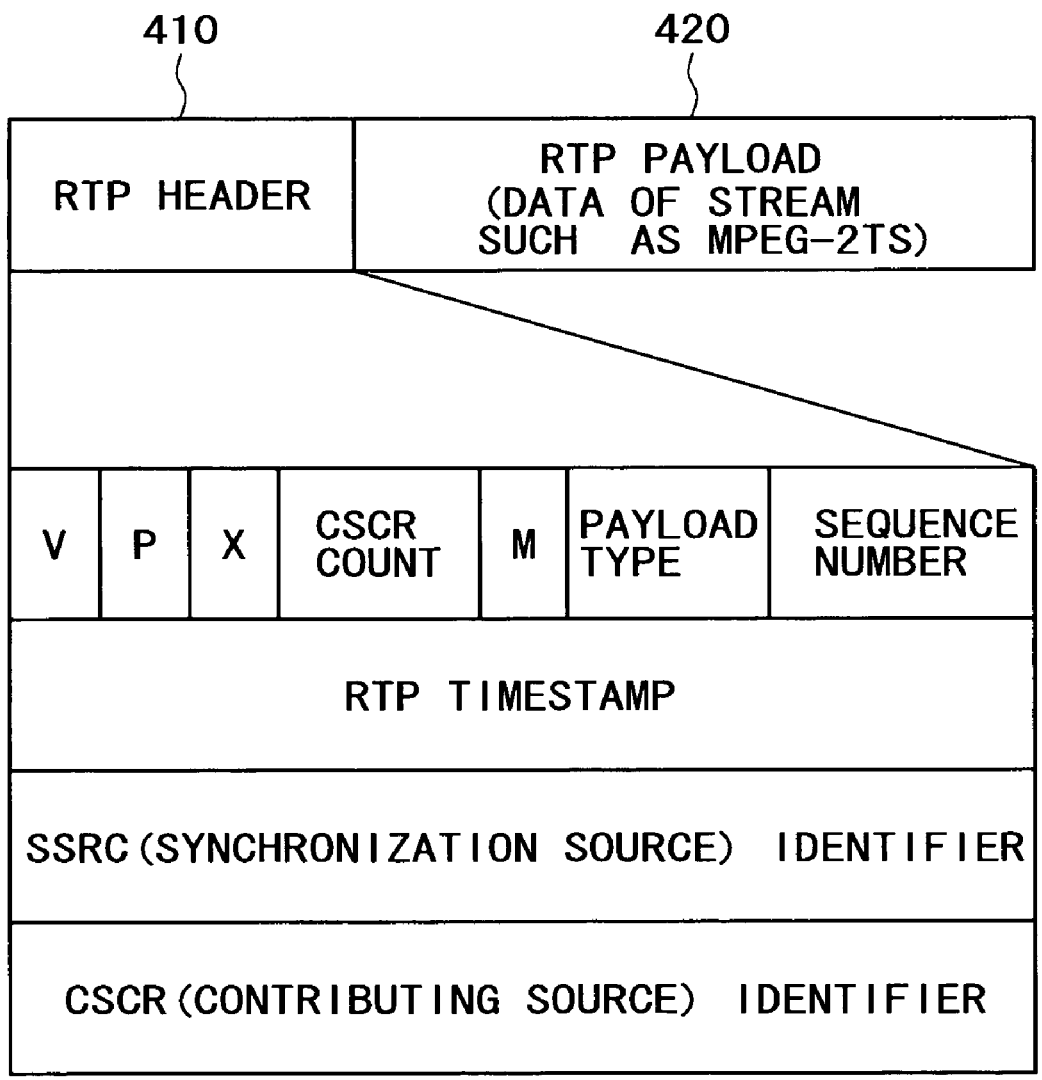
FIG. 2 is a diagram showing the data structure of an RTP packet.

The RTP transmission process unit 110 creates an RTP packet by adding an RTP header to audio/video data, which is referred to hereafter simply as A/V data, and controls transmission of the RTP packet. The RTP transmission process unit 110 is further explained by referring to diagrams as follows. FIG. 2 is a diagram showing the data structure of an RTP packet and FIG. 3 is a diagram showing the configuration of the RTP transmission process unit 110 employed in the communication apparatus implemented by the embodiment of the present invention.

As shown in FIG. 2, an RTP packet includes an RTP header 410 and an RTP payload 420. The RTP header 410 includes a version information field V for storing information on a version, a padding field P, an extension header field X indicating whether or not a header extension exists, a sender CSCR (Contributing Source) count field, a marker information field M, a payload type field, a sequence number field, an RTP timestamp field, an SSRC (Synchronization Source) identifier field and a CSCR identifier field. The RTP payload 420 is a field for storing a transport stream such as an MPEG2-TS received from the encoder 310.

Figure 3:
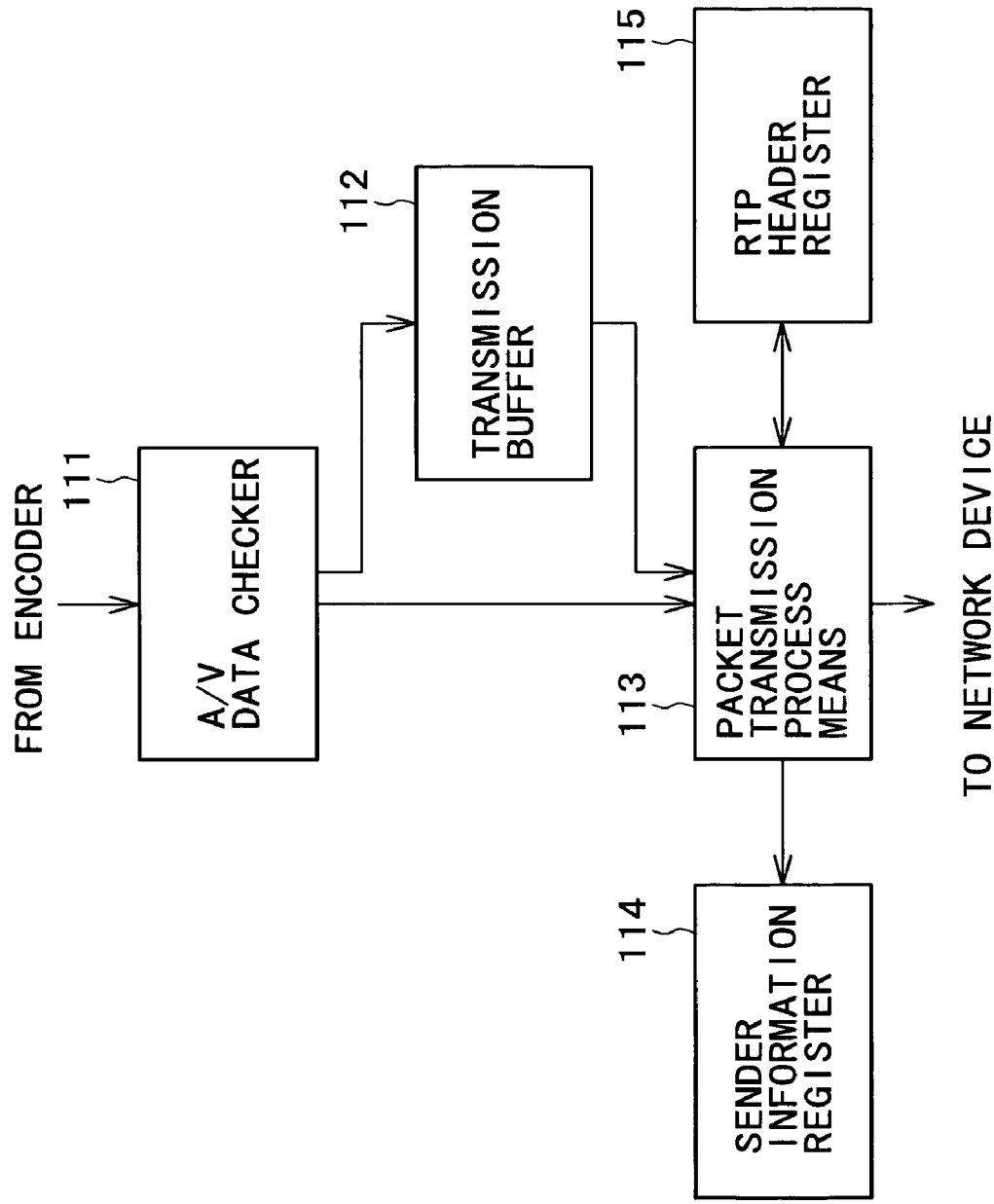
FIG. 3 is a diagram showing the configuration of an RTP transmission process unit employed in the communication apparatus implemented by the embodiment of the present invention.

As shown in FIG. 3, the RTP transmission process unit 110 for generating such an RTP packet includes an A/V data checker 111, a transmission buffer 112, a packet transmission process means 113, a sender information register 114 and an RTP header register 115. The A/V data checker 111 is a component for checking A/V data received from the encoder 310. The transmission buffer 112 is a memory for storing the A/V data. The packet transmission process means 113 is a component for controlling packet transmissions. The sender information register 114 is a component for holding sender information. The RTP header register 115 is a component for managing an RTP header.

The A/V data checker 111 checks the validity of the A/V data received from the encoder 310 and extracts a PCR field including time information from the A/V data. The A/V data checker 111 uses the time information to update the value of an RTP timestamp. In addition, the A/V data checker 111 supplies information such as the size of the A/V data to the packet transmission process means 113. The checked A/V data and the RTP timestamp information are stored in the transmission buffer 112. The RTP header register 115 is used for storing predetermined RTP header information excluding the RTP timestamp. When conditions for a transmission are satisfied, the packet transmission process means 113 creates an RTP packet to be transmitted by adding the RTP header to the A/V data read out from the transmission buffer 112 based on the RTP header information stored in the RTP header register 115. Since the predetermined RTP header data read out from the RTP header register 115 does not include the RTP timestamp, the RTP timestamp according to the extracted value of the PCR field is read out from the transmission buffer 112 and used as the RTP timestamp in the RTP header. The RTP packet created in this way is then supplied to the network device 330 for outputting the packet to the network. At a transmission time, sender information necessary for a sender-report field of a RTCP packet is generated and stored in the sender information register 114. The sender information includes the number of transmitted packets and a transmission octet count.

Figure 4:
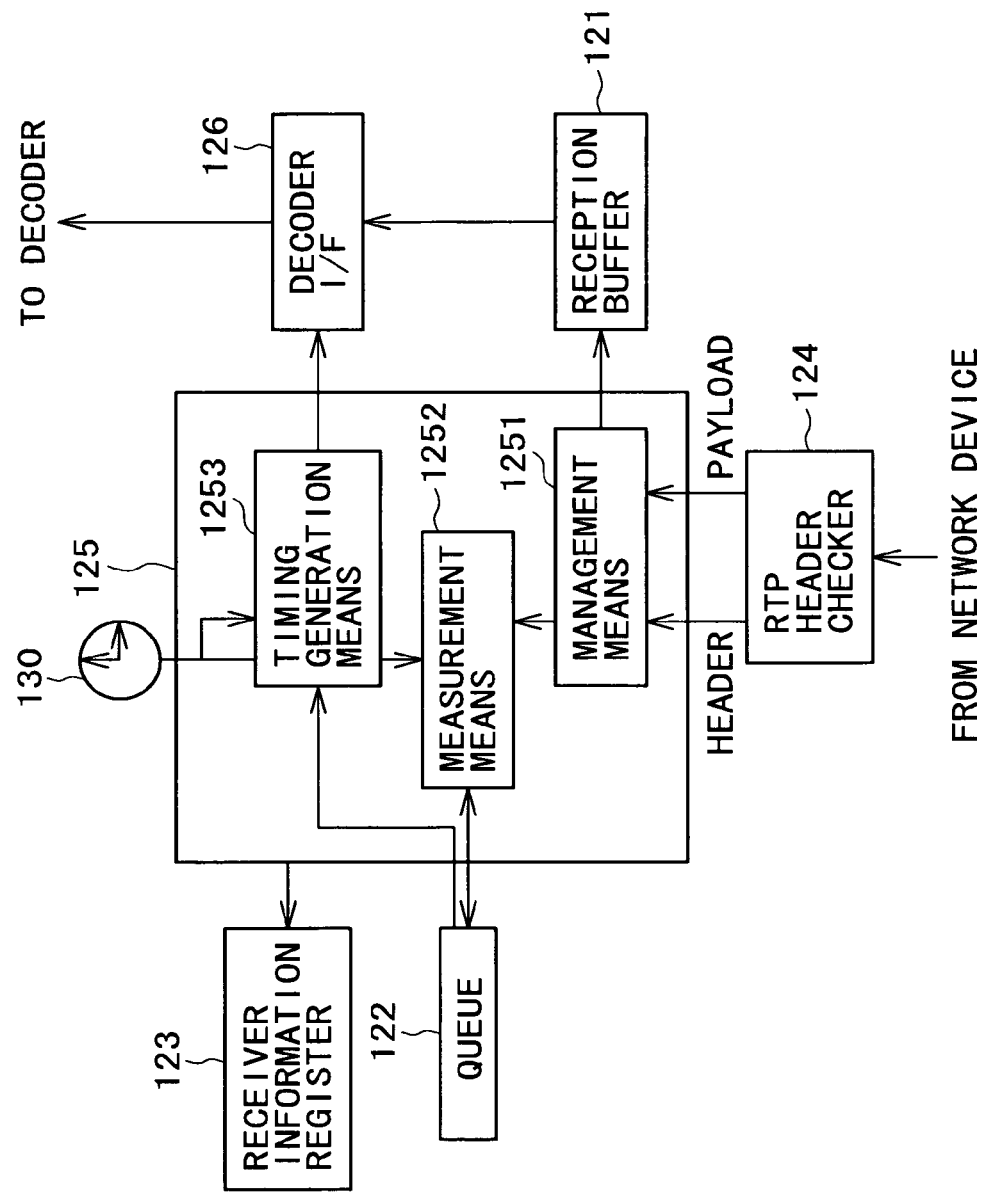
FIG. 4 is a diagram showing the configuration of an RTP reception process unit employed in the communication apparatus implemented by the embodiment of the present invention.

Next, the RTP reception process unit 120 is explained. FIG. 4 is a diagram showing the configuration of the RTP reception process unit 120 employed in the communication apparatus implemented by the embodiment of the present invention.

As shown in the figure, the RTP reception process unit 120 includes a reception buffer 121, a queue 122, a receiver information register 123, an RTP header checker 124, a reception control means 125 and a decoder I/F 126. The reception buffer 121, the queue 122 and the receiver information register 123 form a storage unit whereas the RTP header checker 124, the reception control means 125 and the decoder I/F 126 compose a processing unit. The reception buffer 121 is a memory for storing the payload of an RTP packet received from the network device 330. The queue 122 is a component for storing information on the RTP packet. The receiver information register 123 is a component for storing receiver information for the reception of the RTP packet. The RTP header checker 124 is a component for separating the RTP header from the RTP packet and checking the RTP header. The reception control means 125 is a component for controlling a reception process. The decoder I/F 126 is a component for outputting the RTP payload to the decoder 320. In an operation carried out by the reception control means 125, the timer 130 for RTP processing is referred to.

First of all, the storage unit is explained to be followed by a description of the processing unit.

The reception buffer 121 is used for storing the payload of an RTP packet which has passed an inspection carried out by the RTP header checker 124.

The queue 122 has a plurality of storage areas each used for storing information on an RTP packet. The storage areas are managed by using indexes. The information on an RTP packet includes the header of the RTP packet, the start address of the payload included in the RTP packet and the data length of the RTP packet. As described above, the payload is stored in the reception buffer 121.

The receiver information register 123 is used for storing information necessary for filling up the receiver-report field of an RTCP packet. The information includes the number of received RTP packets, information on fluctuations of network jitters and the number of lost RTP packets and the like.

The RTP header checker 124 checks the header of a packet received from the network device 330 to form a judgment as to whether or not the received packet is an RTP packet. If the RTP header checker 124 finds out that the received packet is an RTP packet, the RTP header checker 124 separates the RTP packet into the RTP header and the payload, which are then supplied to the reception control means 125.

The reception control means 125 includes a management means 1251, a measurement means 1252 and a timing generation means 1253. The management means 1251 is a component for managing an order of packets by using the queue 122. The measurement means 1252 is a component for measuring fluctuations of network jitters by using the timer 130. The timing generation means 1253 is a component for measuring a timing to output data to the decoder 320 by using information stored in the queue 122 and the timer 130.

The management means 1251 stores a payload received from the RTP header checker 124 in the reception buffer 121 and records the start address, data length along with the RTP header. To be more specific, the start address, the data length and the RTP header are stored in a queue storage area indicated by an index corresponding to a sequence number assigned to the RTP packet. That is to say, the RTP packet has a sequence number next to the sequence number of an RTP packet output last to the decoder 320 and the index is incremented in accordance with the sequence number. The management using the queue 122 allows RTP packets arriving at incorrect times due to effects of the network to be rearranged into a correct order or the same RTP packet received for the second time to be discarded. In addition, a counter is provided, and every time packet data is received, the count value of a counter is incremented to count the number of received RTP packets. The number of received RTP packets is stored in the receiver information register 123.

The measurement means 1252 computes fluctuations of network jitters by using the values of the timer 130 for RTP processing and the RTP timestamps of RTP packets. The result of the computation is stored in the receiver information register 123.

The timing generation means 1253 acquires the RTP timestamp of an RTP packet with the smallest sequence number among RTP packets stored on the queue 122, and compares the RTP timestamp with the value of the timer 130 for RTP processing. If they match each other, the timing is determined to be normal. With this timing, the timing generation means 1253 gives an instruction to the decoder I/F 126 to read out data from the reception buffer 121. At that time, the sequence number of the RTP packet, whose payload is read out by the decoder I/F 126 from the reception buffer 121, is saved to be compared with the transmission numbers of RTP packets with their payloads currently being transferred and previously transferred to the decoder 320. A result of the comparison is used for analyzing the state as to how many RTP packets have been lost. If an RTP packet is determined to have been lost, a corresponding area of the receiver information register 123 is updated.

In accordance with the instruction issued by the reception control means 125 to read out data from the reception buffer 121, the decoder I/F 126 reads out as much data of a transport stream as specified from the reception buffer 121, starting from a specified address and transfers the data to the decoder 320.

Figure 5:
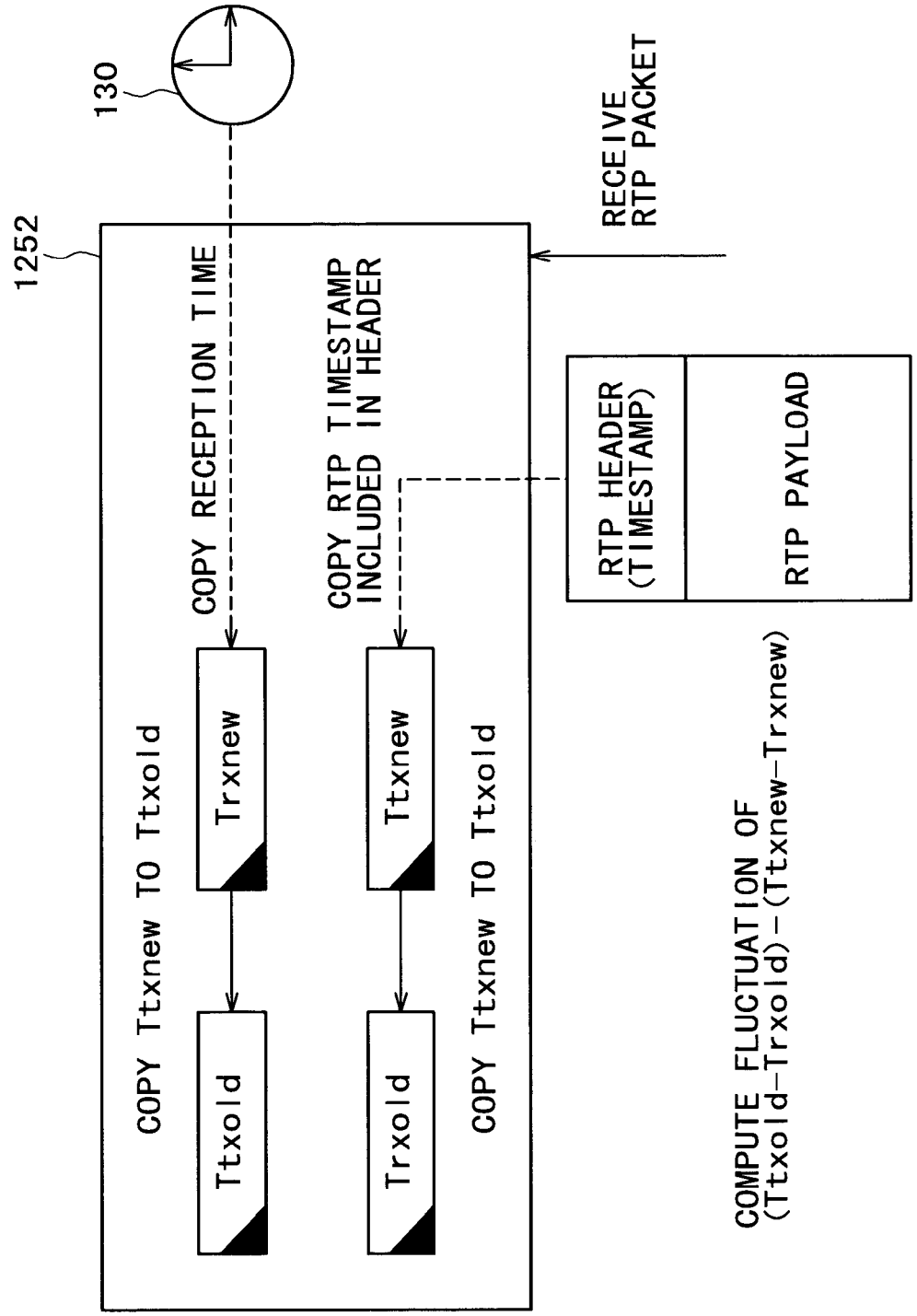
FIG. 5 is a diagram showing the procedure of fluctuation computation carried out by the RTP reception process unit.

The computation of fluctuations of network jitters is explained as follows. FIG. 5 is a diagram showing the procedure of the fluctuation computation carried out by the RTP reception process unit 120. The measurement means 1252 has a Ttxold register, a Trxold register, a Ttxnew register and a Trxnew register. The Ttxold register is a register for storing an RTP timestamp of an RTP packet received previously. The Trxold register is a register for storing a time at which the RTP packet including the RTP timestamp was received previously. The Ttxnew register is a register for storing an RTP timestamp of an RTP packet received presently. The Trxnew register is a register for storing a time at which the RTP packet including the RTP timestamp is received presently. When an RTP packet is received, an RTP timestamp included in the RTP header of the RTP packet is copied to the Ttxnew register and an arrival time according to the timer 130 is copied to the Trxnew register. As described above, an RTP timestamp included in the RTP header of the RTP packet received previously is stored in the Ttxold register whereas the arrival time computed in accordance with the timer 130 for this RTP packet is stored in the Trxold register.

In accordance with RTP specifications (RFC), a fluctuation is represented by the following expression:

$$(Ttxold - Trxold) - (Ttxnew - Trxnew) \tag{1}$$

As described above, the RTP process circuit 100 provided separately from the host-side control unit 200 independently processes an RTP packet. It is thus possible to provide a communication apparatus capable of carrying out a streaming process without being affected by the condition of the load borne by the host-side control unit 200.

In particular, on the reception side, processes to detect duplication of a packet, rearrange the order of packets and determine a timing to transfer a payload to the decoder 320 are carried out by using hardware. In addition, computation of fluctuations of network jitters can now be kept at the precision of a system clock signal. Thus, a detailed report can be obtained without losing the streaming stability and lowering the streaming quality. Moreover, since the timing to supply A/V data to the decoder 320 is accurate, it is not necessary to deliver the A/V data to the decoder 320 in advance. As a result, the decoder 320 is capable of reproducing the received A/V data with a high degree of stability by using a buffer with a small storage capacity.

The communication apparatus described above has both the transmission and reception functions. However, it is possible to conceive a communication apparatus, which is provided with only one of the functions in order to make the apparatus compact. In the case of a receiver, for example, only the RTP reception process unit 120 may be provided. In addition, it is also possible to conceive a configuration without the RTCP process means 210, which is used mainly for improving the condition of the network.

Moreover, as described above, the RTP reception process unit 120 employed by the communication apparatus on the reception side determines a timing to output data of a received RTP packet to the decoder 320 by referring to an RTP timestamp included in the RTP header of the RTP packet. For this reason, it is necessary to synchronize the RTP timer 130 used by the communication apparatus on the transmission side with the RTP timer 130 used by the communication apparatus on the reception side. Since the RTP timer 130 varies from apparatus to apparatus, however, there is a discrepancy between the RTP timer 130 used by the communication apparatus on the transmission side and the RTP timer 130 used by the communication apparatus on the reception side. If the RTP timer 130 used by the communication apparatus on the transmission side is proceeding fast with respect to the RTP timer 130 used by the communication apparatus on the reception side, for example, the RTP reception process unit 120 employed by the communication apparatus on the reception side has to wait longer till a period of time equal to the sum of a timestamp of the transmission side and jitters lapses. For this reason, a large number of RTP packets must be held internally in the communication apparatus on the reception side. On the other hand, if the RTP timer 130 used by the communication apparatus on the transmission side is proceeding slowly with respect to the RTP timer 130 used by the communication apparatus on the reception side, a relation, which indicates that a time equal to the sum of the timestamp included in a received packet and jitters leads ahead of the present time indicated by the RTP timer 130 on the reception side, may hold true in some cases. Also in such a case, data is supplied to the decoder 320 at a delayed time. In addition, the time delay increases with the lapse of time. If there is a discrepancy between the RTP timer 130 used by the communication apparatus on the transmission side and the RTP timer 130 used by the communication apparatus on the reception side as described above, the speed to transfer data to the decoder 320 decreases, leading to deterioration of the streaming quality.

Figure 6:
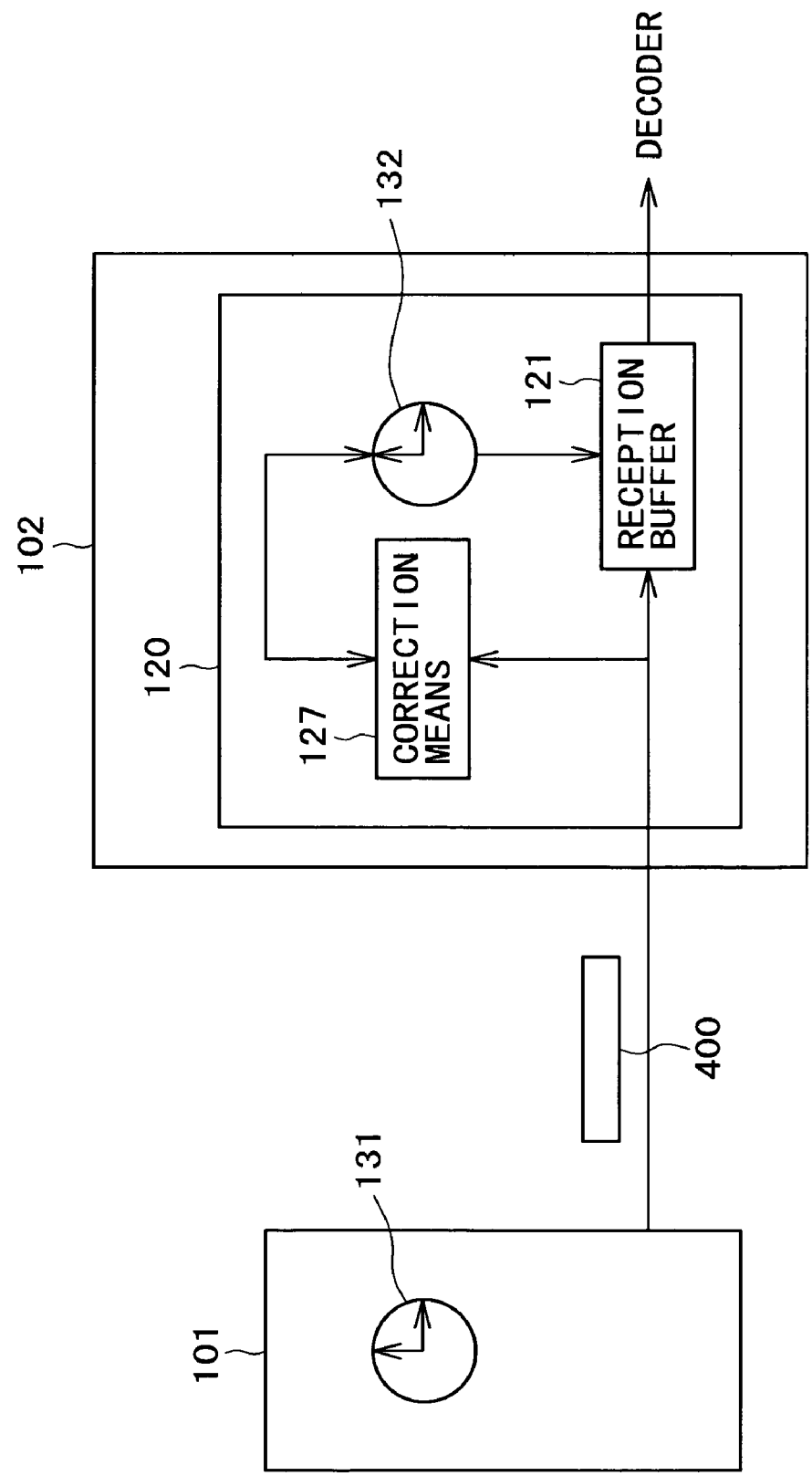
FIG. 6 is a block diagram showing the configuration of a communication apparatus implemented by a second embodiment of the present invention.

In order to solve the problem described above, in a second embodiment of the present invention, the RTP reception process unit 120 is provided with a means for synchronizing the RTP timers 130. FIG. 6 is a block diagram showing the configuration of a communication apparatus implemented by the second embodiment of the present invention.

A transmission-side communication apparatus 101 is provided with the RTP transmission process unit 110 shown in FIG. 3 and a transmission-side RTP timer 131. The RTP transmission process unit 110 sets an RTP timestamp generated on the basis of time information indicated by the transmission-side RTP timer 131 in the RTP header of an RTP packet 400. Then, the transmission-side communication apparatus 101 transmits the RTP packet 400 to a reception-side communication apparatus 102.

The reception-side communication apparatus 102 is provided with the RTP reception process unit 120 shown in FIG. 4. However, the RTP reception process unit 120 has an embedded correction means 127. In the RTP reception process unit 120, the payload of the RTP packet 400 received from the transmission-side communication apparatus 101 is stored in the reception buffer 121. A reception-side RTP timer 132 measures a time equal to the sum of a transmission timestamp included in the RTP packet 400 and jitters. As this time is reached, the payload stored in the reception buffer 121 is output to the decoder 320.

The correction means 127 fetches the transmission timestamp from the received RTP packet 400 and computes a difference between the timestamp and the value of the reception-side RTP timer 132. If the difference is found to be greater than a predetermined value, the reception-side RTP timer 132 is newly reset at the transmission timestamp included in the RTP packet 400.

As described above, in the second embodiment of the present invention, when the transmission-side RTP timer 131 is not synchronized with the reception-side RTP timer 132, the value of the reception-side RTP timer 132 is automatically corrected to eliminate the discrepancy. As a result, the synchronization between the transmission-side RTP timer 131 and the reception-side RTP timer 132 can be assured so as to sustain the streaming stability and the streaming high quality.

In addition, in general, when the communication system is started up from an initial state, the transmission-side communication apparatus 101 and the reception-side communication apparatus 102 carry out a process to synchronize the transmission-side RTP timer 131 with the reception-side RTP timer 132. Thus, in the communication apparatus provided by the present invention, the RTP reception process unit 120 is capable of measuring the arrival time of an RTP packet with a high degree of precision. By utilizing this measured arrival time, the RTP reception process unit 120 is capable of setting the reception-side RTP timer 132 on the reception side with ease.

Figure 7:
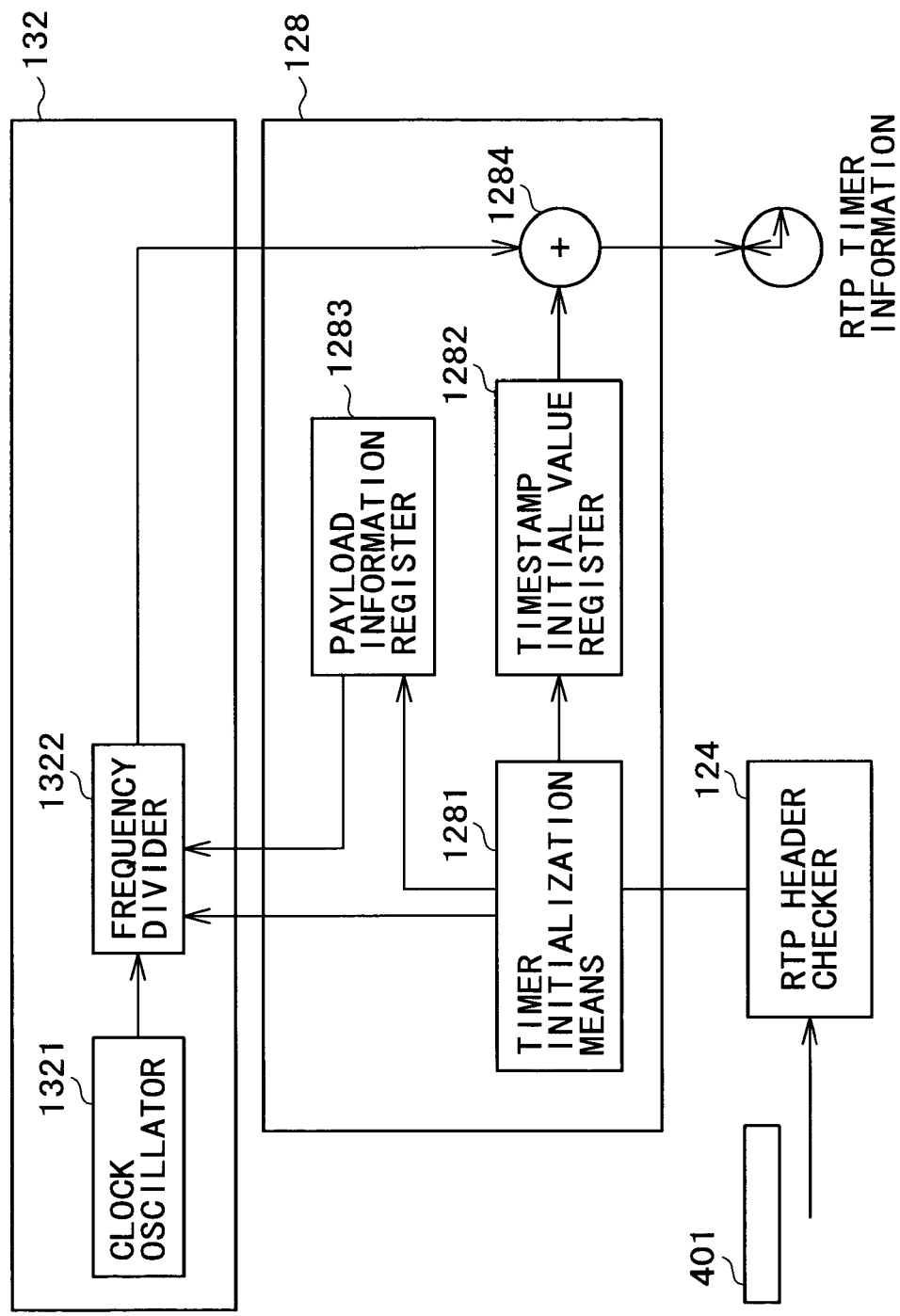
FIG. 7 is a block diagram showing the configuration of an RTP reception process unit employed in a communication apparatus implemented by a third embodiment of the present invention.

FIG. 7 is a block diagram showing the configuration of an RTP reception process unit employed in a communication apparatus implemented by a third embodiment of the present invention. Components identical with their counterparts shown in FIG. 4 are denoted by the same reference numerals as the counterparts.

The RTP reception process unit employed in a communication apparatus implemented by the third embodiment further has a time information generation means 128 in addition to the components employed in the RTP reception process unit 120 shown in FIG. 4.

In the case of the third embodiment, the reception-side RTP timer 132 has a clock oscillator 1321 for generating an original clock signal with a predetermined frequency and a frequency divider 1322 for generating another clock signal with a desired frequency by dividing the predetermined frequency of the original clock signal.

The time information generation means 128 includes a timer initialization means 1281, a timestamp initial value register 1282 and a payload information register 1283. The timer initialization means 1281 is a component for initializing the reception-side RTP timer 132. The timestamp initial value register 1282 is a register for storing the timestamp included in a received RTP packet. The payload information register 1283 is a register for storing the type of the payload.

At an initialization time, an initial RTP packet 401, passing an inspection carried out by the RTP header checker 124, is supplied to the time information generation means 128. The timer initialization means 1281 stores the RTP timestamp included in the RTP header of the RTP packet 401 into the timestamp initial value register 1282 and the type of the payload included in the RTP packet 401 into the payload information register 1283. The timer initialization means 1281 then activates the frequency divider 1322. Then, by referring to the payload information, the frequency divider 1322 divides the frequency of the clock signal generated by the clock oscillator 1321 to output time information at a frequency suitable for the type of the payload. An example of the time information is a count value. An adder 1284 adds the value output by the frequency divider 1322 to an initial value stored in the timestamp initial value register 1282 to get an addition result equal to the sum of the RTP timestamp on the transmission side and a network delay of the initially received RTP packet. If the network delay is minimized, the addition result is almost equal to the RTP timestamp on the transmission side.

Since the RTP reception process unit 120 is activated upon reception of an initial RTP packet without a delay, the reception-side RTP timer 132 can be synchronized to the transmission-side RTP timer 131 by using the RTP timestamp of the initial RTP packet.

As described above, in the present invention, RTP transmission and reception processes, which used to be supported by software of the control unit on the host side, are supported by hardware capable of operating independently of the control unit on the host side. In addition, since the processing on the host side is now limited to RTCP-packet processing, which does not need to be carried out in a real-time manner, the load borne by the host can thus be reduced.

Therefore, a predetermined streaming quality can be sustained without regard to the state of the load borne by the host. In particular, in a reception process, network conditions such as the arrival time of a packet and a network delay can be measured at the system clock resolution and, in addition, timing to output data to the decoder 320 can also be determined at the system clock resolution. As a result, the scale of the circuit can be made compact by, for example, reducing the storage capacity of the buffer employed in the decoder 320.

In an operation to create a packet, there are some cases in which additional information generated on the basis of predetermined information data included in a transport stream as a payload must be attached to the packet, requiring that a processing mechanism for attaching the additional information to the packet be provided. For example, a communication apparatus for processing an RTP packet including an MPEG2-TS as a payload is provided with a register for storing a PCR field value used for synchronizing the RTP timestamp of the RTP packet being processed to the PCR field. The communication apparatus is also provided with a buffer for storing the RTP packet. The storage capacity of the buffer is set at a value allowing for a design margin. By eliminating the design margin, the scale of the circuit can be made even more compact.

In the case of the present invention, the additional information attached to a packet and managed by using a register is now managed by using a storage area used also for storing the transport stream. Thus, the register can be eliminated.

Figure 8:
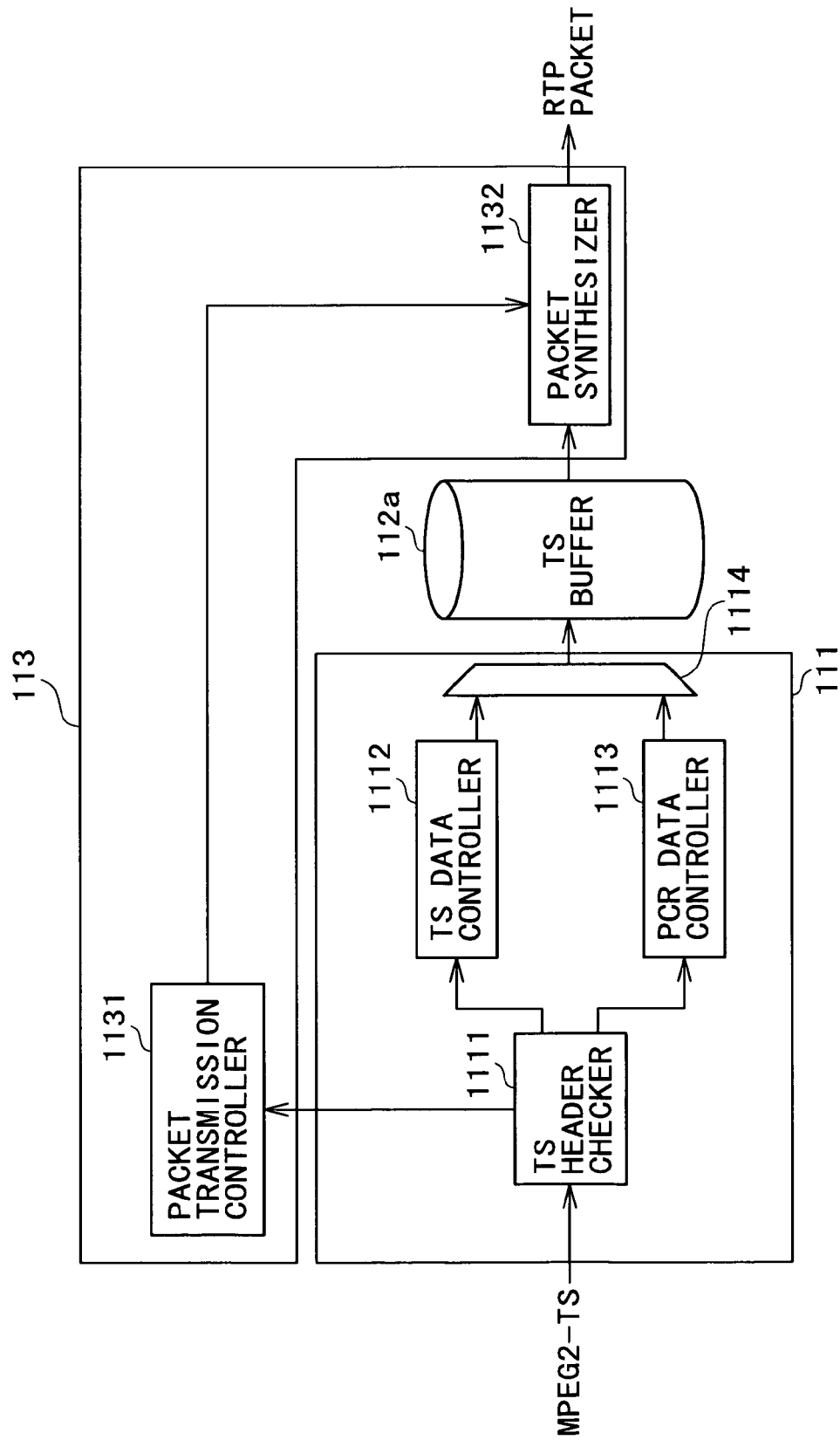
FIG. 8 is a block diagram showing the configuration of an RTP transmission process unit employed in a communication apparatus implemented by a fourth embodiment of the present invention.

The following description explains an embodiment wherein, in order to synchronize the RTP timestamp of an RTP packet with the PCR field of an MPEG2-TS, the PCR field value, which used to be managed by using a register is managed by using a storage area also used for storing the RTP packet. The description begins with an explanation of a fourth embodiment implementing a communication apparatus, which manages PCR fields and an RTP packet by using a storage area common to both the PCR fields and the RTP packet. FIG. 8 is a block diagram showing the configuration of the RTP transmission process unit 110 employed in the communication apparatus implemented by the fourth embodiment of the present invention. Components identical with their counterparts shown in FIGS. 1 and 3 are denoted by the same reference numerals as the counterparts.

The RTP transmission process unit shown in FIG. 8 includes an A/V data checker 111, a TS buffer 112a and a packet transmission process means 113. The A/V data checker 111 is a component for inputting an MPEG2-TS from the encoder 310, inspecting the input MPEG2-TS and then storing the inspected MPEG2-TS into the TS buffer 112a. The TS buffer 112a is a memory for storing a PCR value in addition to the data of the MPEG2-TS. The packet transmission process means 113 is a component for adding an RTP header to information data set in the TS buffer 112a to create an RTP packet and transmitting the RTP packet.

The A/V data checker 111 includes a TS header checker 1111, a TS data controller 1112, a PCR data controller 1113 and a selector 1114. The TS header checker 1111 is a component for checking a TS header. The TS data controller 1112 is a component for controlling an operation to write the data of a TS packet into the TS buffer 112a. The PCR data controller 1113 is a component for controlling an operation to write PCR data into the TS buffer 112a. The selector 1114 is a component for selecting data output by the TS data controller 1112 or the PCR data controller 1113 as data to be written into the TS buffer 112a.

The TS header checker 1111 checks the validity of the input MPEG2-TS and searches the header of the TS packet for a PCR field. If a PCR field is found, the TS header checker 1111 stores the value of the PCR field in a PCR temporary register 1113a (see FIG. 9) employed in the PCR data controller 1113. The TS header checker 1111 also writes data of a TS packet passing the validity inspection into a TS temporary register 1112a (see FIG. 9) employed in the TS data controller 1112. In addition, the TS header checker 1111 supplies information, such as the data length of the TS packet, to be referred to in managing the boundaries of the TS packet stored in the TS buffer 112a to the packet transmission process means 113.

The TS data controller 1112 includes the TS temporary register 1112a for temporarily storing TS data and a TS controller 1112b (see FIG. 9) for controlling an operation to write the TS data into the TS buffer 112a. The TS controller 1112b controls an operation to write the data of the TS packet, which has been stored temporarily in the TS temporary register 1112a by the TS header checker 1111, from the register 1112a into the TS buffer 112a.

By the same token, the PCR data controller 1113 includes a PCR temporary register 1113a for temporarily storing PCR data and a PCR controller 1113b (see FIG. 9) for controlling an operation to write the PCR data into the TS buffer 112a. The PCR controller 1113b stores the PCR data at a predetermined location in the TS buffer 112a.

The selector 1114 selectively accepts a request made by the TS data controller 1112 to write TS data into the TS buffer 112a or a request made by the PCR data controller 1113 to write PCR data into the TS buffer 112a.

The TS buffer 112a is a dual-port RAM used for storing TS packets to serve as the payload of an RTP packet as well as used for storing PCR values.

The packet transmission process means 113 includes a packet transmission controller 1131 and a packet synthesizer 1132. The packet transmission controller 1131 is a component for determining a timing to transmit a packet. The packet synthesizer 1132 is a component for enclosing the MPEG2-TS stored in the TS buffer 112a in an RTP packet and outputting the RTP packet. The embodiment shown in FIG. 8 does not include the sender information register 114 and the RTP header register 115, which are employed in the embodiment shown in FIG. 3.

On the basis of information acquired from the TS header checker 1111, the packet transmission controller 1131 manages boundaries in mapping the data of a TS packet onto an RTP payload stored in the TS buffer 112a. As soon as conditions are altogether satisfied, the packet transmission controller 1131 issues a request for a transfer of an RTP packet to the packet synthesizer 1132. The request for a transfer of an RTP packet includes a read start address and a read data length and the like. The read start address is the start address of an area in the TS buffer 112a. The packet synthesizer 1132 reads out data of a TS packet from the area and adds an RTP header to the data to generate the RTP packet. Then, the packet synthesizer 1132 transfers the RTP packet to the network device 330.

In order to synchronize an RTP timestamp to a PCR field, it is necessary to abide by the following rules.

(1): An RTP payload shall not include a plurality of TS packets each having a PCR field.

(2): An RTP payload may include no TS packet having a PCR field.

(3): A TS packet having a PCR field shall be placed at the beginning of an RTP payload.

(4): If a current RTP payload does not include a TS packet having a PCR field, the RTP timestamp of an immediately preceding RTP packet is used as the RTP timestamp of the current RTP payload.

TS packets are arranged in the TS buffer 112a by following the rules described above.

Figure 9:
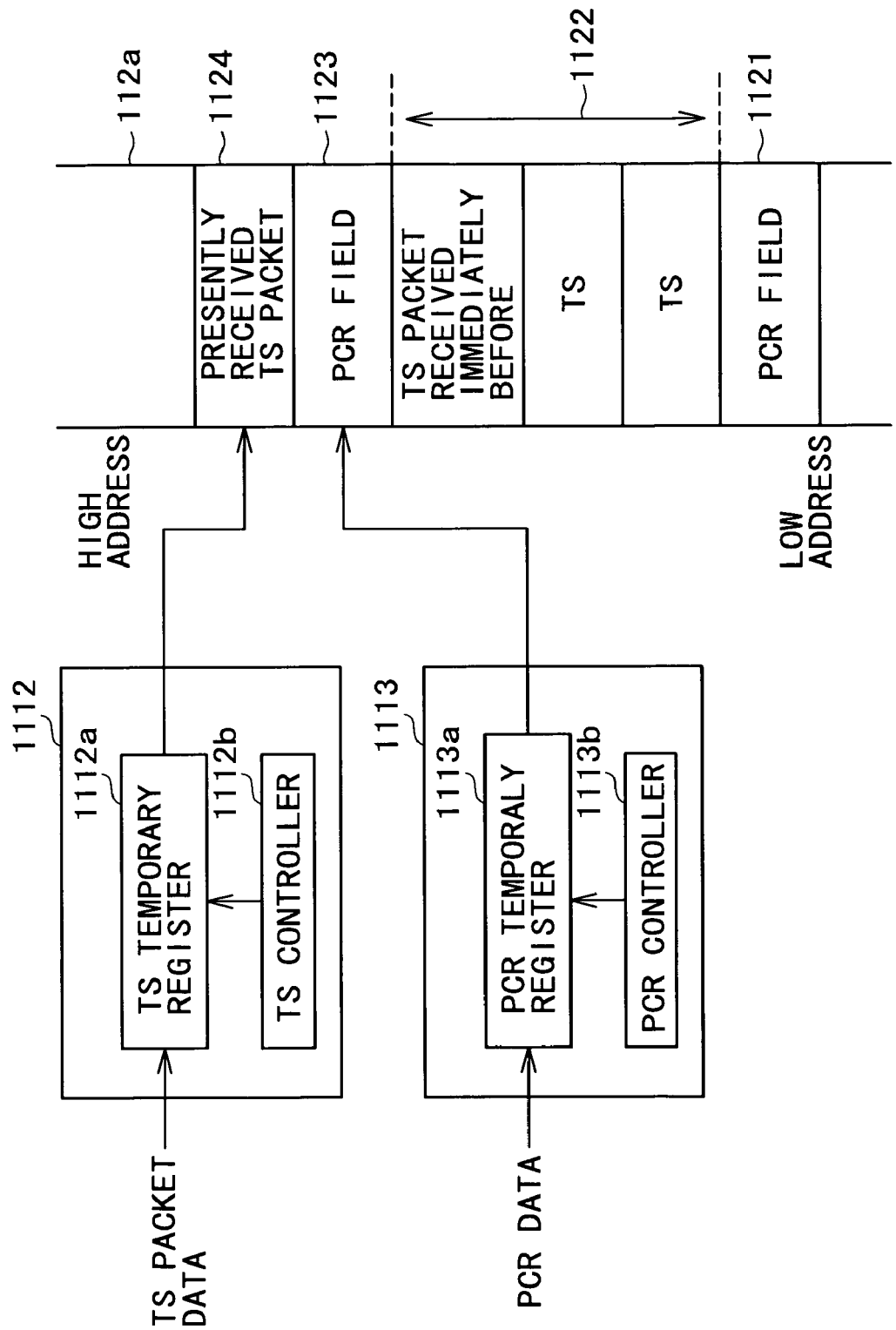
FIG. 9 is a diagram showing a procedure of processing for a case in which a TS packet having a PCR field is mapped onto the beginning of an RTP payload.
Figure 10:
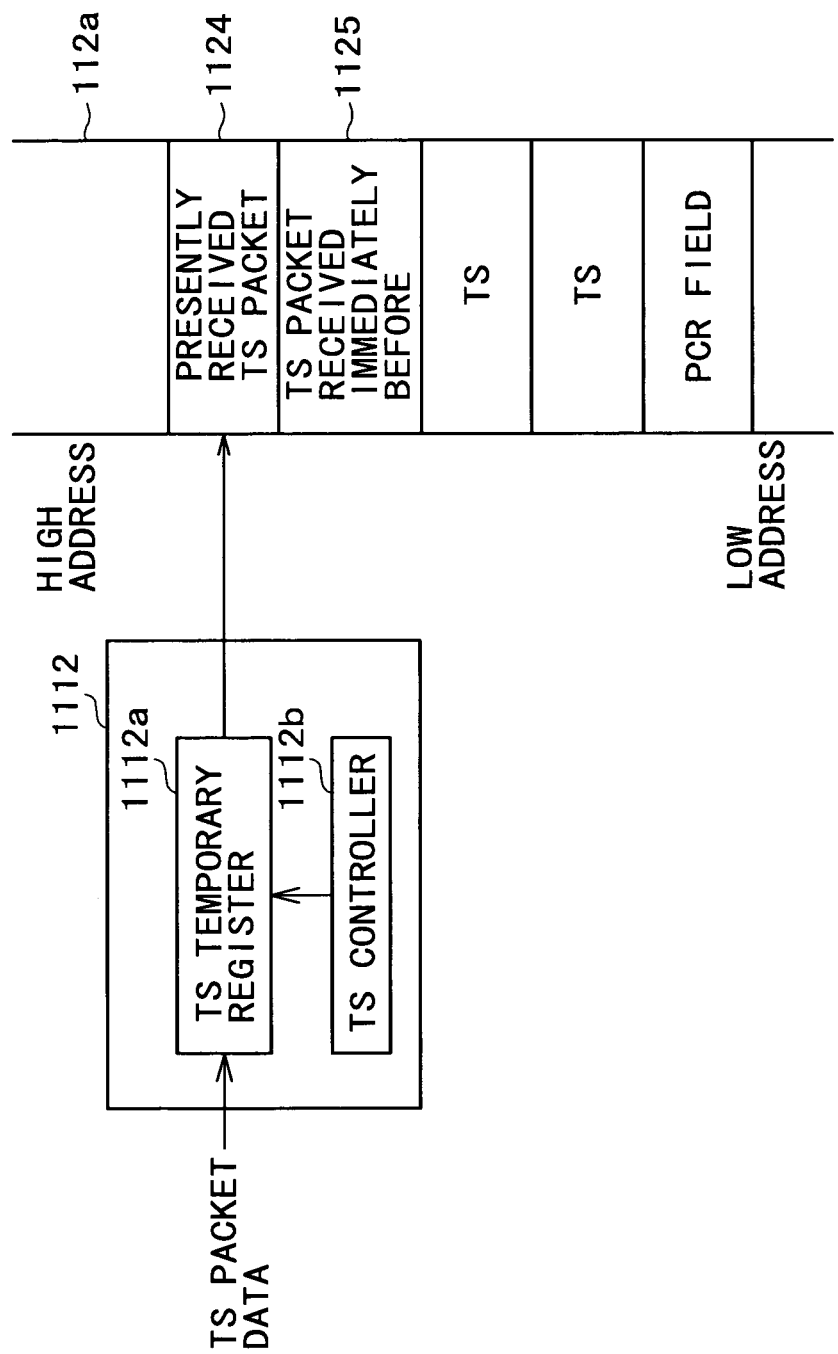
FIG. 10 is a diagram showing a procedure of processing for a case in which a TS packet having no PCR field is mapped onto the beginning an RTP payload.

By referring to diagrams, the following description explains buffering and writing processes carried out by the TS data controller 1112 and the PCR data controller 1113 to temporarily keep data of a PCR field in the PCR temporary register 1113a and transfer the PCR data from the register 1113a to the TS buffer 112a. FIG. 9 is a diagram showing a procedure of processing for a case in which a TS packet having a PCR field is mapped onto the beginning of an RTP payload. On the other hand, FIG. 10 is a diagram showing a procedure of processing for a case in which a TS packet having no PCR field is mapped onto the beginning an RTP payload.

The TS header checker 1111 writes the data of a TS packet passing the inspection carried out by the TS header checker 1111 into the TS temporary register 1112a. If the TS packet includes a PCR field, the TS header checker 1111 stores the data of the PCR field into the PCR temporary register 1113a.

If an input TS packet includes a PCR field, rule (3) is applied to the packet to map the packet onto the beginning of an RTP payload. By the way, if an immediately preceding RTP payload happens to end with a TS packet immediately preceding the current packet, the current TS packet is also mapped onto the beginning of the current RTP payload even if the current TS packet does not include a PCR field unlike the current TS packet described above. As described above, FIG. 9 is a diagram showing a procedure of processing for a case in which a current TS packet having a PCR field is mapped onto the beginning of an RTP payload. In the case shown in FIG. 9, so far, a PCR field has been stored in an area 1121 of the TS buffer 112a and previous TS packets composing an immediately preceding RTP payload have been mapped onto an area 1122 of the TS buffer 112a. Then, when the header of a current TS packet is supplied to the TS temporary register 1112a employed in the TS data controller 1112, the TS controller 1112b of the TS data controller 1112 examines the header to form a judgment as to whether or not the header includes a PCR field. If the header includes a PCR field, the current and subsequent TS packets are sequentially written into the TS buffer 112a, beginning at an address obtained by adding an offset equal to the length of a PCR field to be stored in an area 1123 in the TS buffer 112a to the last address of the immediately preceding RTP payload, which was mapped onto the area 1122. At a point of time the operation to write the current TS packet into an area 1124 in the TS buffer 112a is completed, the PCR controller 1113b employed in the PCR data controller 1113 writes a PCR value from the PCR temporary register 1113a of the PCR data controller 1113 to the area 1123.

As is obvious from the above description, in the TS buffer 112a, the current TS packet mapped onto the area 1124 is delimited from a group of previous TS packets forming the immediately preceding RTP payload mapped onto the area 1122 by a PCR field, which was included in the current TS packet but is now stored in the area 1123. The PCR field stored in the area 1121 is the timestamp of the immediately preceding RTP packet including the group of previous TS packets composing the immediately preceding RTP payload mapped onto the area 1122, which has an address higher than the address of the area 1121. By the same token, the PCR field stored in the area 1123 is the timestamp of the current RTP packet including the current TS packet mapped onto the area 1124 having an address higher than the address of the area 1123 as the first TS packet at the beginning of the payload of the current RTP packet.

As described above, FIG. 10 is a diagram showing a procedure of processing for a case in which a TS packet having no PCR field is mapped onto the beginning an RTP payload. In the case shown in FIG. 10, a TS packet immediately preceding the current packet has been mapped onto an area 1125 in the TS buffer 112a as a packet ending the immediately preceding RTP payload. In this case, the TS controller 1112b employed in the TS data controller 1112 writes the current and subsequent TS packets sequentially into the TS buffer 112a, beginning at the next address of the immediately preceding TS packet, which was mapped onto the area 1125, without regard to whether or not the current TS packet temporarily stored in the TS temporary register 1112a employed in the TS data controller 1112 includes a PCR field.

As described above, in the RTP transmission process unit 110, PCR values are managed by using the TS buffer 112a instead of using the PCR temporary register 1113a, which serves merely as a temporary register for storing the value of a PCR field. Since values of PCR fields are not stored in registers prior to transfers of RTP packets to the network device 330, the number of such registers can be reduced. In addition, since an operation to estimate the rate of data coming from the encoder 310 is easier to carry out then an operation to predict the rate of appearances of PCR fields in the data, a proper size of the TS buffer 112a can be set, allowing all components composing the circuit to be used efficiently.

Figure 11:
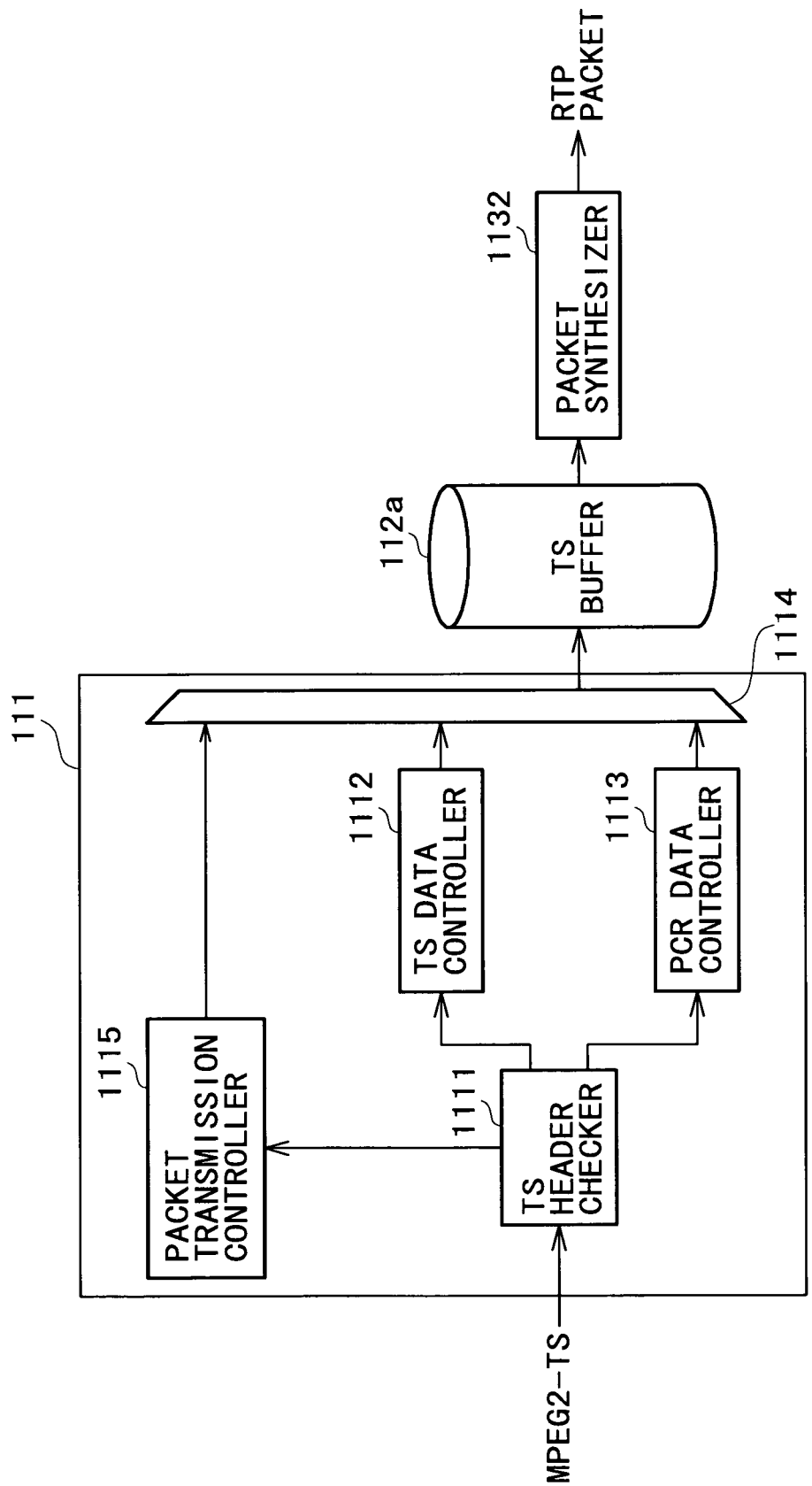
FIG. 11 is a block diagram showing the configuration of an RTP transmission process unit employed in a communication apparatus implemented by a fifth embodiment of the present invention.

In addition to the management of PCR fields by using the TS buffer 112a as described above, control information for RTP transmissions can also be managed by using a buffer. The following description explains a fifth embodiment implementing a communication apparatus in which transmission control information and packets are managed by using a storage area common to the information and the packets. FIG. 11 is a block diagram showing the configuration of the RTP transmission process unit employed in the communication apparatus implemented by the fifth embodiment of the present invention. Components identical with their counterparts shown in FIGS. 1, 3 and 8 are denoted by the same reference numerals as the counterparts.

The difference between the RTP transmission process unit employed in the fifth embodiment shown in FIG. 11 and that employed in the fourth embodiment shown in FIG. 8 is the packet transmission controller. To be more specific, in the case of the fourth embodiment, the packet transmission controller 1131 is included inside the packet transmission process means 113 and used for determining a timing to transmit an RTP packet. The packet transmission controller 1131 issues a request for a transmission of an RTP packet to the packet synthesizer 1132 with such a determined timing. In the case of the fifth embodiment, on the other hand, a packet transmission controller 1115 is employed in the A/V data checker 111 to be used as a means for writing control information for transmissions into the TS buffer 112a. The packet synthesizer 1132 transfers RTP packets to the network device 330 by referring to the control information.

Much like the packet transmission controller 1131 employed in the fourth embodiment shown in FIG. 8, the packet transmission controller 1115 manages boundaries used in mapping TS packets onto an RTP payload in the TS buffer 112a on the basis of information received from the TS header checker 1111. As soon as conditions are altogether satisfied, the packet transmission controller 1115 writes a request to transmit transmission control information of an RTP packet into the TS buffer 112a. The packet synthesizer 1132 is monitoring the TS buffer 112a to detect a request for a transfer of an RTP packet to the network device 330 in the transmission control information. As such a request is detected, the RTP packet is transferred to the network device 330 in accordance with the transmission control information stored in the TS buffer 112a.

Figure 12:
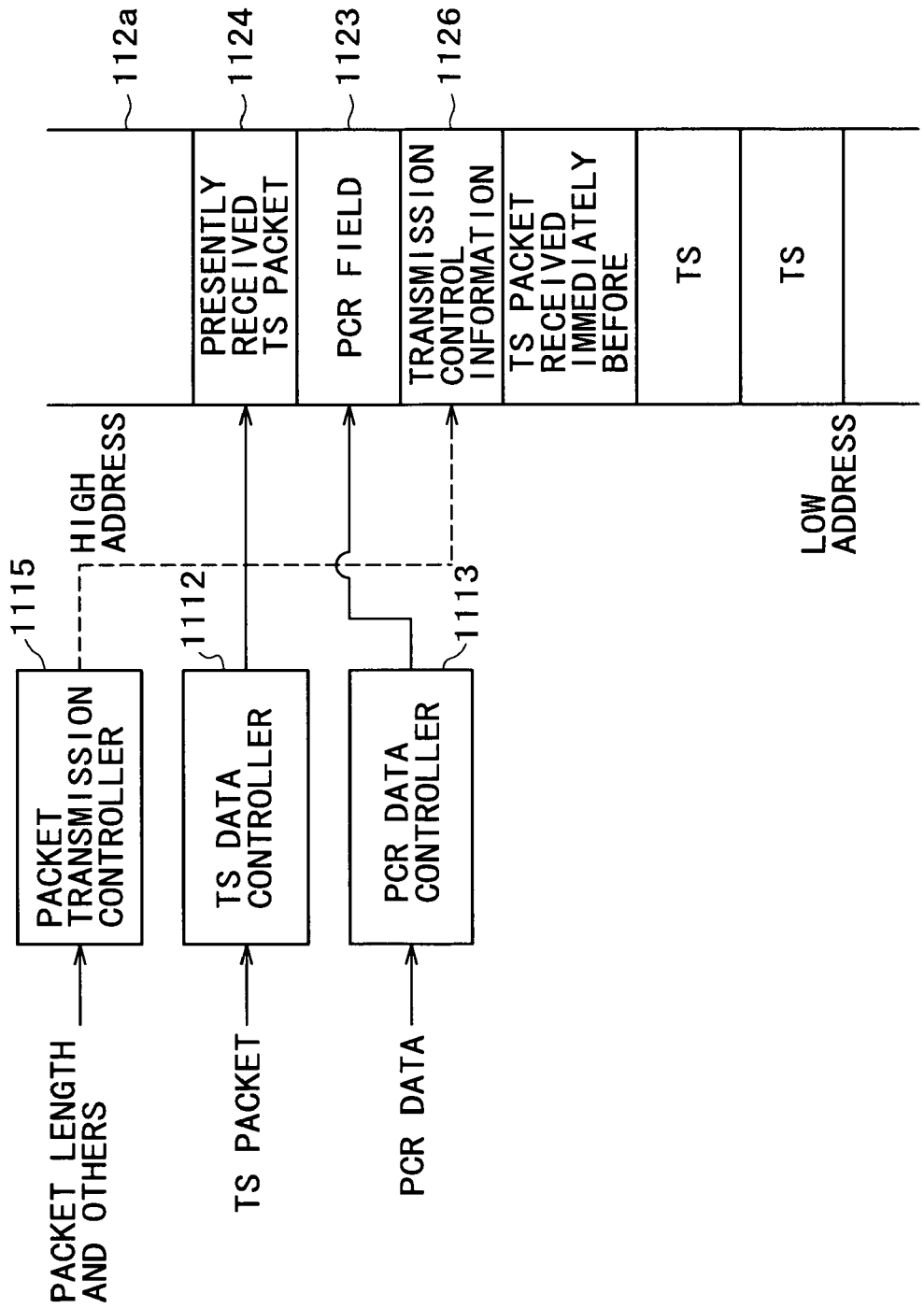
FIG. 12 is a diagram showing the procedure of processing to store transmission control information.

The following description explains buffering and writing operations carried out by each of the packet transmission controller 1115, the TS data controller 1112 and the PCR data controller 1113. FIG. 12 is a diagram showing the procedure of processing to write transmission control information into the TS buffer 112a. Elements identical with their respective counterparts shown in FIG. 9 are denoted by the same reference numerals as the counterparts and the explanation of the identical elements is not given.

The TS data controller 1112 writes a current TS packet mapped onto the beginning of an RTP payload into the TS buffer 112a, starting at an address obtained by adding an offset, which is equal to the sum of the length of a PCR field to be stored in an area 1123 in the TS buffer 112a and the length of transmission control information to be stored in an area 1126 in the TS buffer 112a, to the last address of an area for storing the immediately preceding TS packet. The PCR data controller 1113 then stores the value of the PCR field into the area 1123.

At the point of time when the operation to store the current and all subsequent TS packets composing the same RTP payload in the TS buffer 112a starting at an area 1124 is completed, the packet transmission controller 1115 writes the transmission control information in the area 1126. Typically, the transmission control information includes a transmission request flag and the size of an RTP packet to be transmitted. The size of an RTP packet to be transmitted is the number of bytes of all TS packets composing the RTP payload included in the RTP packet. As an alternative, the packet transmission controller 1115 writes the transmission control information in the area 1126 prior to the operation to store the current and all subsequent TS packets composing the RTP payload in the TS buffer 112a. In this case, the size of an RTP packet included in the transmission control information in the area 1126 is updated every time a TS packet of the RTP payload is stored in the TS buffer 112a. At the point of time when the last TS packet of the RTP payload is stored in the TS buffer 112a, the transmission request flag may be set.

Figure 13:
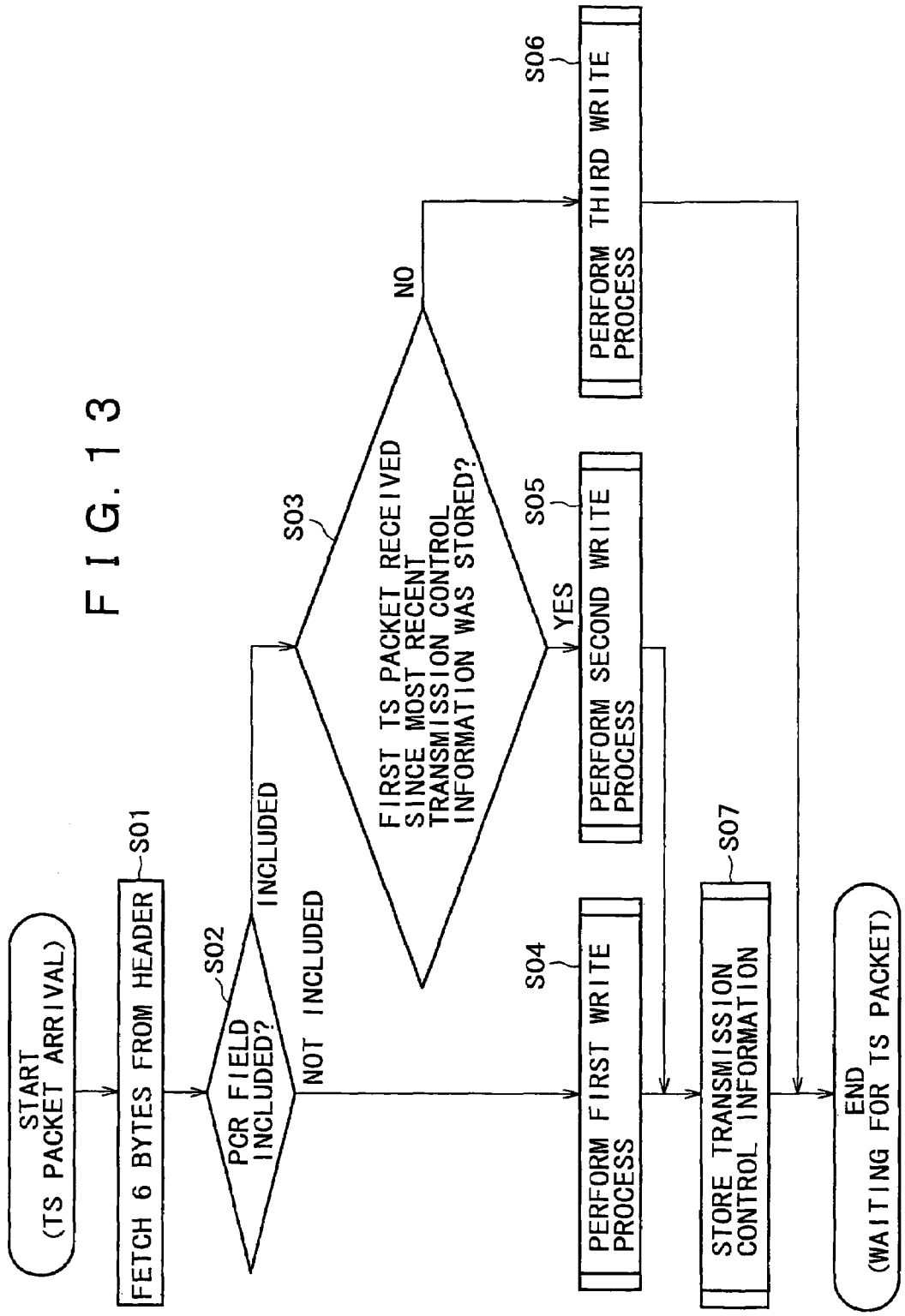
FIG. 13 shows a flowchart representing the entire procedure of a transmission process.

The following description explains operations of the RTP transmission process unit having such a configuration in detail by referring to the diagrams. FIG. 13 shows a flowchart representing the entire procedure of the transmission process. In this case, it is assumed that the PCR field is included in a 6-byte area at the beginning of a TS packet, and the TS packet has a length of 188 bytes.

The processing procedure represented by the flowchart shown in FIG. 13 is started when the encoder 310 supplies a TS packet to the RTP transmission process unit. The processing procedure begins with a step S01 at which the 6 bytes at the beginning of the TS packet are fetched.

Then, the flow of the processing procedure goes on to a step S02 to form a judgment as to whether or not the 6 bytes include a PCR field. If the 6 bytes do not include a PCR field, the flow of the processing procedure goes on to a step S04. If the 6 bytes include a PCR field, on the other hand, the flow of the processing procedure goes on to a step S03 to form a judgment as to whether or not the received TS packet is the first TS packet received since the most recent transmission control information was stored in the TS buffer 112a. Transmission control information is stored in the next area in the TS buffer 112a in an operation carried out at a step S07 to write the transmission control information into the TS buffer 112a when a request for a transmission of an immediately preceding RTP packet is made as will be described in detail later. If the received TS packet is the first TS packet received since the most recent transmission control information was stored in the TS buffer 112a, the flow of the processing procedure goes on to a step S05. If the received TS packet is not the first TS packet received since the most recent transmission control information was stored in the TS buffer 112a, on the other hand, the flow of the processing procedure goes on to a step S06.

At the step S04, a first write process is carried out to store the TS packet including no PCR field into the TS buffer 112a. Then, after the first write process is completed, the flow of the processing procedure goes on to the step S07.

At the step S05, a second write process is carried out to store the TS packet and a PCR field included in the TS packet into the TS buffer 112a. The TS packet is the first TS packet received since the most recent transmission control information was stored in the TS buffer 112a. Then, after the second write process is completed, the flow of the processing procedure goes on to the step S07.

At the step S06, a third write process is carried out to store the TS packet and a PCR field included in the TS packet into the TS buffer 112a. The TS packet is not the first TS packet received since the most recent transmission control information was stored in the TS buffer 112a. Then, after the third write process is completed, the RTP transmission process unit enters a state of waiting for the next TS packet.

At the step S07, the transmission control information is stored in the TS buffer 112a. Then, after the transmission control information is stored in the TS buffer 112a, the RTP transmission process unit enters a state of waiting for the next TS packet.

As described above, one of the first, second and third write processes is carried out in dependence on whether or not the received TS packet includes a PCR field and, if the received TS packet includes a PCR field, in dependence on the state of setting an RTP packet in the TS buffer 112a. The first, second and third write processes are explained one after another as follows.

Figure 14:
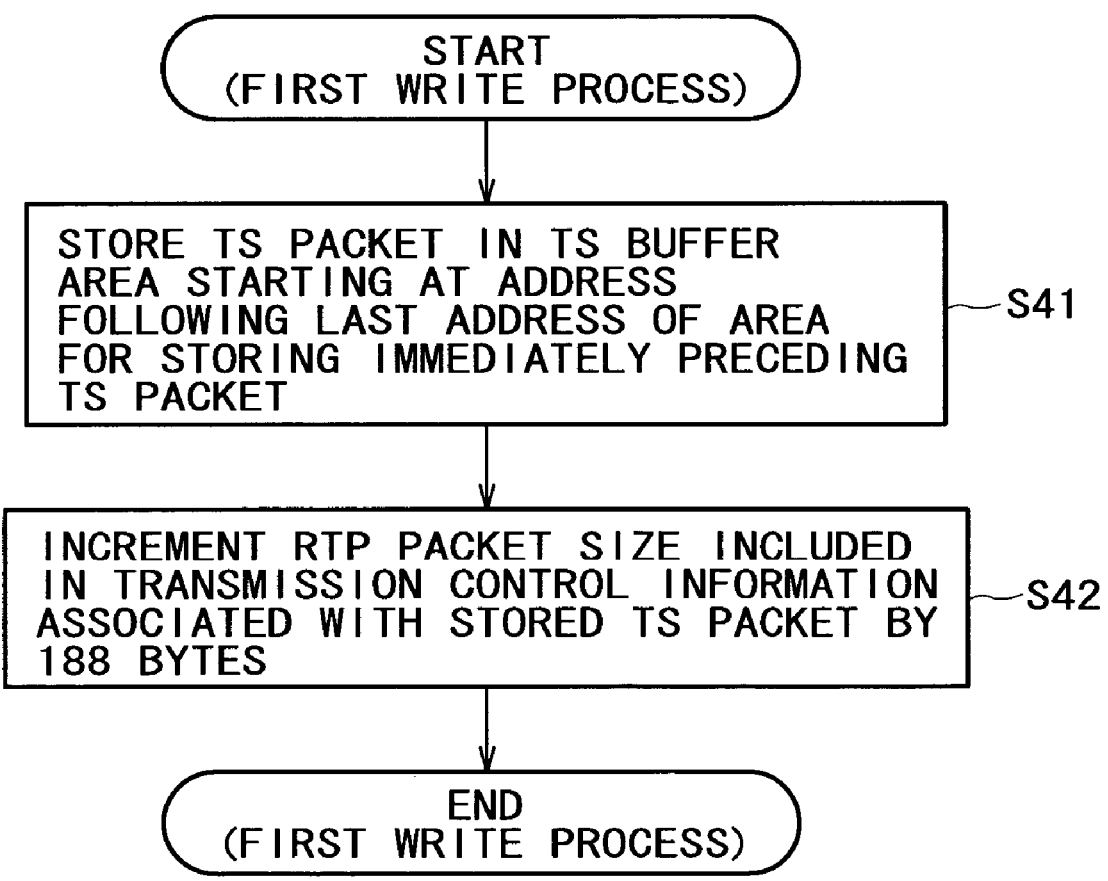
FIG. 14 shows a flowchart representing the processing procedure of a first write process.
Figure 15:
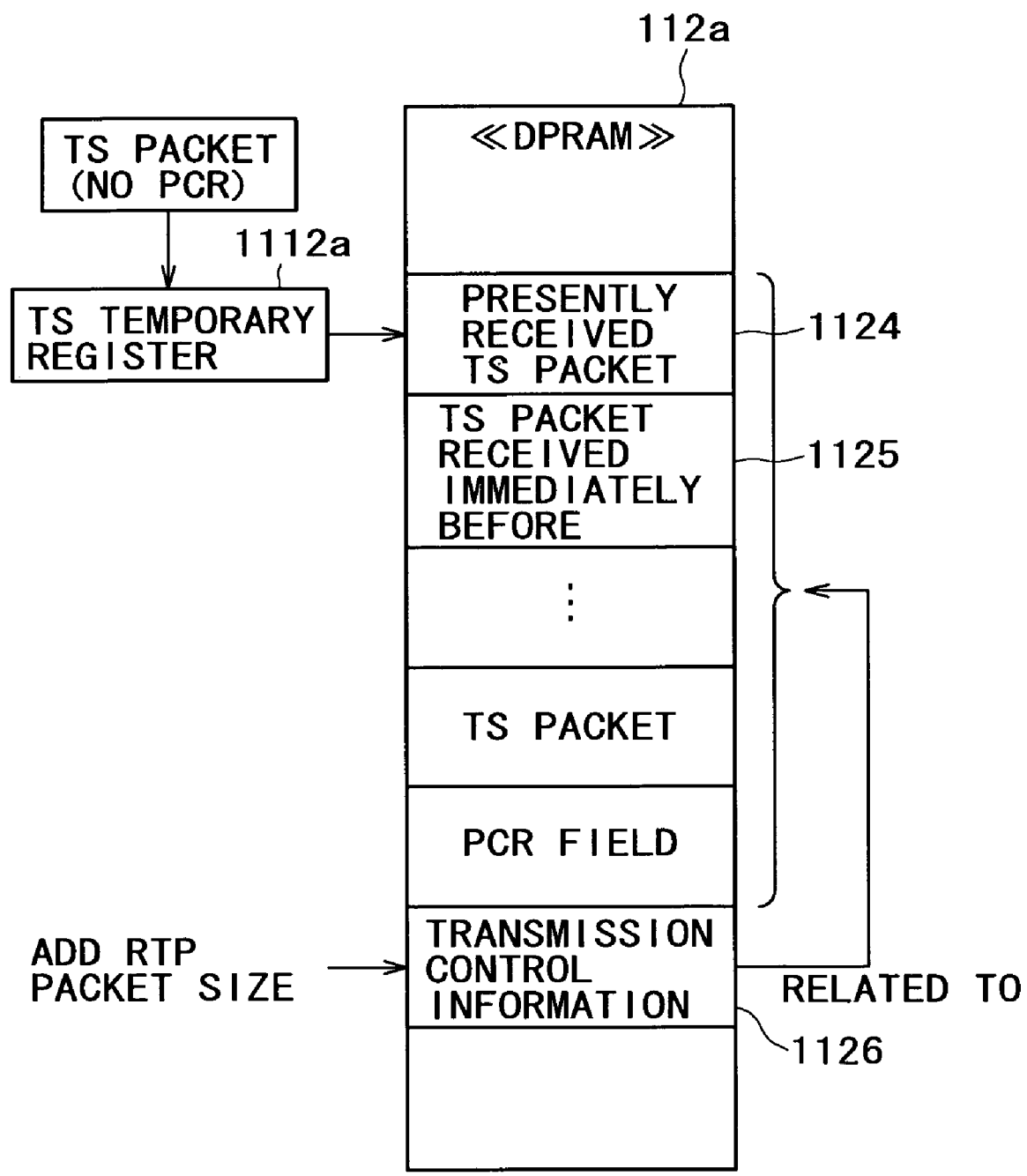
FIG. 15 is a diagram showing the state of data stored in a transmission buffer for the first write process.

In the first place, the first write process is explained. FIG. 14 shows a flowchart representing the processing procedure of the first write process. FIG. 15 is a diagram showing the status of an RTP packet set in the TS buffer 112a.

The first write process represented by the flowchart shown in FIG. 14 is activated if the received TS packet does not include a PCR field. The flowchart begins with a step S41 at which the received TS packet is stored in the TS buffer 112a. To be more specific, the received TS packet is stored in an area 1124 starting at an address following the last address of an area 1125 in which the TS packet immediately preceding the received TS packet has been stored.

Then, at the next step S42, an increment of 188 bytes is added to the RTP packet size, which is a field included in the transmission control information associated with the received TS packet, in order to update the size of the RTP packet.

To put it in detail, the received TS packet temporarily stored in the TS temporary register 1112a is written into the area 1124 following the area 1125 for storing the TS packet immediately preceding the received TS packet as shown in FIG. 15. In addition, the RTP packet size included in the transmission control information stored in the area 1126 is updated to reflect the fact that the received TS packet has been added to the RTP packet.

Figure 16:
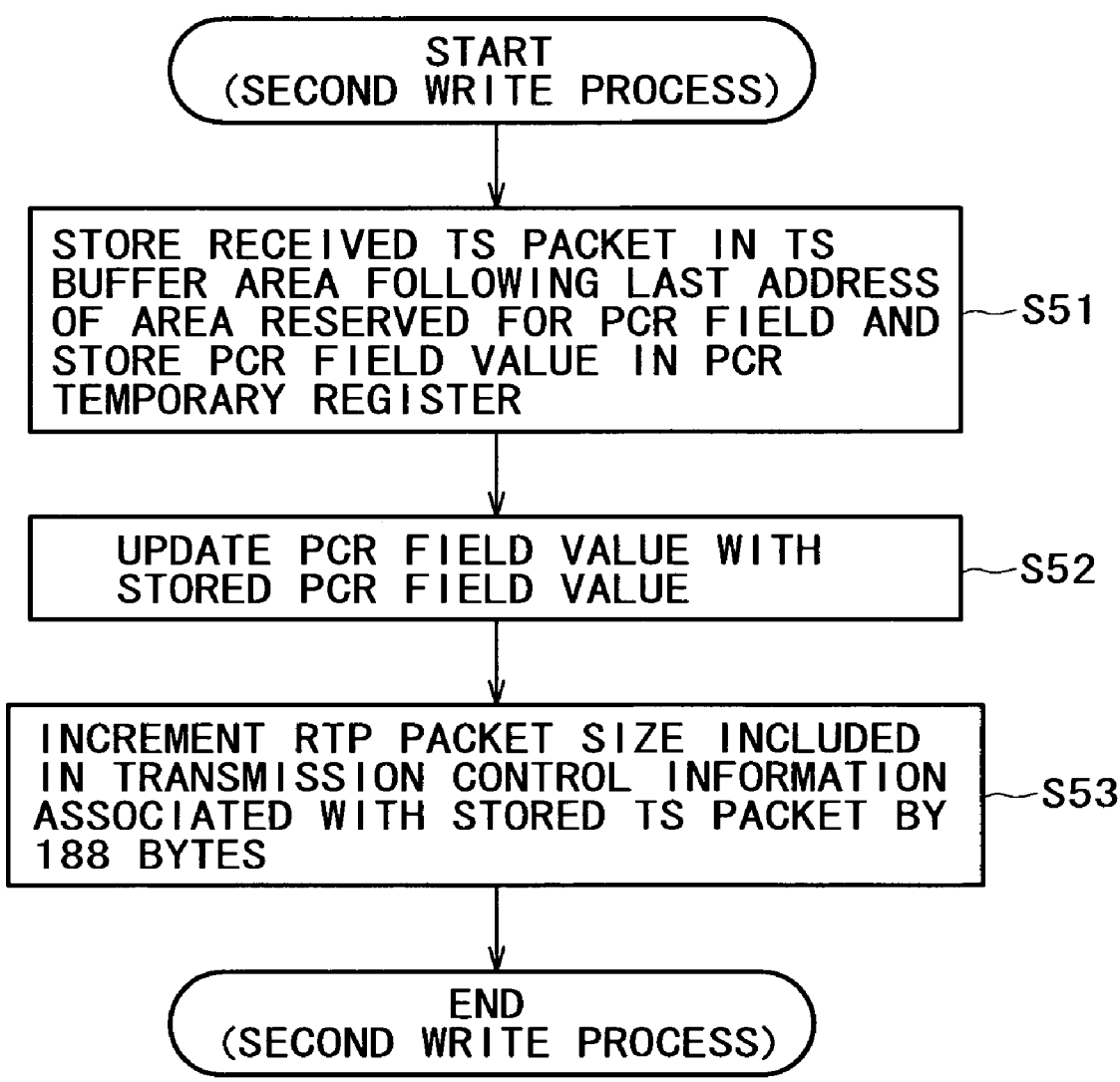
FIG. 16 shows a flowchart representing the processing procedure of a second write process.
Figure 17:
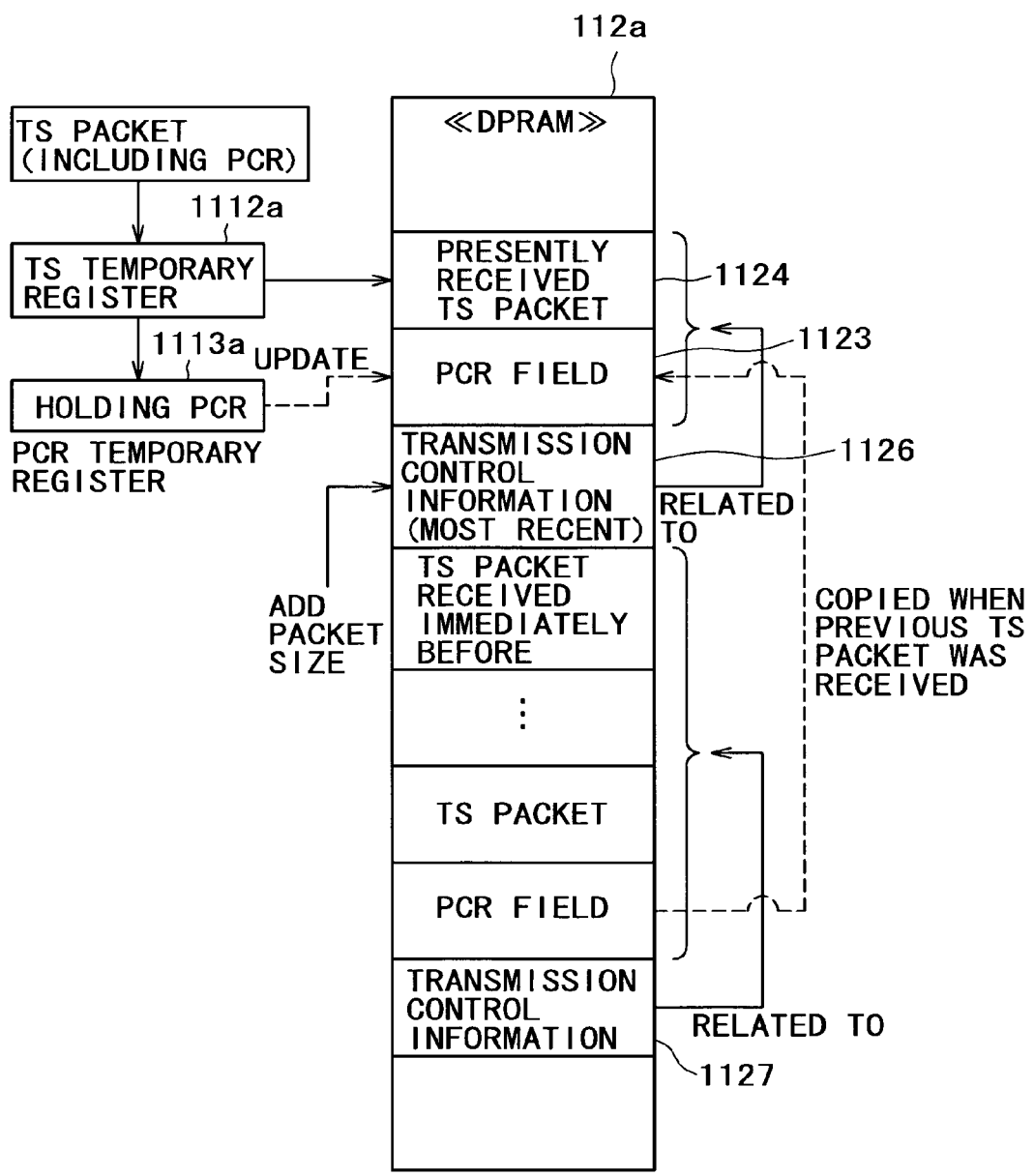
FIG. 17 is a diagram showing the state of data stored in the transmission buffer for the second write process.

In the second place, the second write process is explained. FIG. 16 shows a flowchart representing the processing procedure of the second write process. FIG. 17 is a diagram showing the status of an RTP packet set in the TS buffer 112a.

The second write process represented by the flowchart shown in FIG. 16 is activated if the received TS packet includes a PCR field and is the first TS packet received since transmission control information was stored in the TS buffer 112a. That is to say, the second write process represented by the flowchart shown in FIG. 16 is activated when all preparations to start an operation to set a new RTP payload in the TS buffer 112a are done upon completion of the operation to set an immediately preceding RTP payload including a series of previously received TS packets ending with the immediately preceding TS packet.

The flowchart begins with a step S51 at which the received TS packet is stored in the TS buffer 112a. To be more specific, the received TS packet is stored in an area following the last address of an area, which has been reserved in the TS buffer 112a, being allocated to the value of the PCR field of this RS packet. The value of the PCR field is stored temporarily in the PCR temporary register 1113a.

Then, at the next step S52, the value of the PCR field stored temporarily in the PCR temporary register 1113a is copied to an area 1123 reserved in the TS buffer 112a, being allocated to the value of the PCR field.

Subsequently, at the next step S53, an increment of 188 bytes is added to the RTP packet size, which is a field included in the transmission control information for the received TS packet stored in the TS buffer 112a at the step S51, in order to update the size of the RTP packet.

In such processing, the packet transmission request flag included in the transmission control information stored in an area 1127 in the TS buffer 112a, as shown in FIG. 17, was set before the second write process is activated. The transmission control information stored in the area 1127 is associated with the immediately preceding RTP payload. At that time, areas 1126 and 1123 are reserved in the TS buffer 112a in advance, being allocated to the transmission control information and the value of the PCR field respectively. When the second write process is carried out, the received TS packet temporarily stored in the TS temporary register 1112a is copied to an area 1124 following the last address of the area 1123. In addition, the RTP packet size included in the transmission control information stored in the area 1126 is updated to reflect the fact that the received TS packet has been added to the RTP packet.

Figure 18:
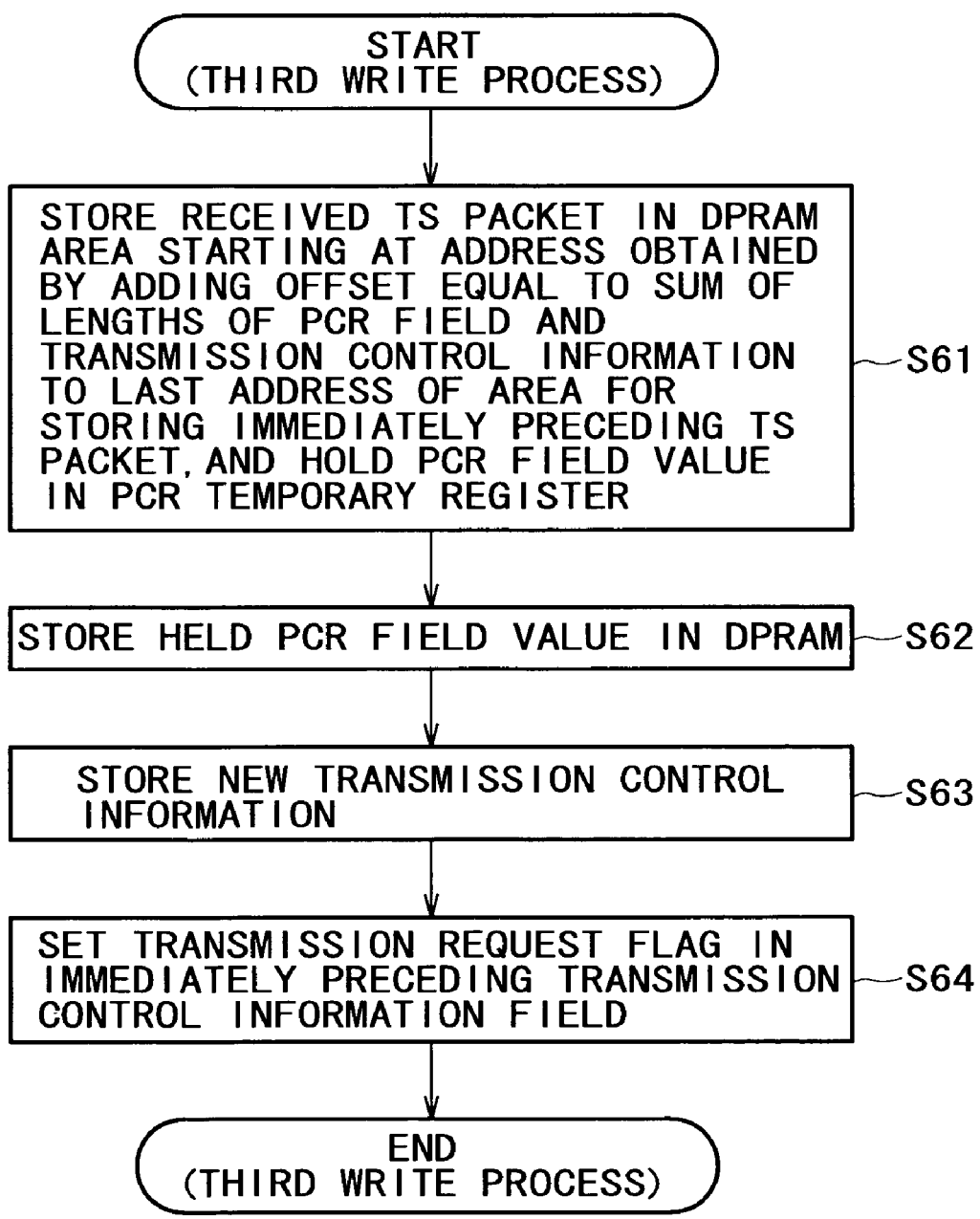
FIG. 18 shows a flowchart representing the processing procedure of a third write process.
Figure 19:
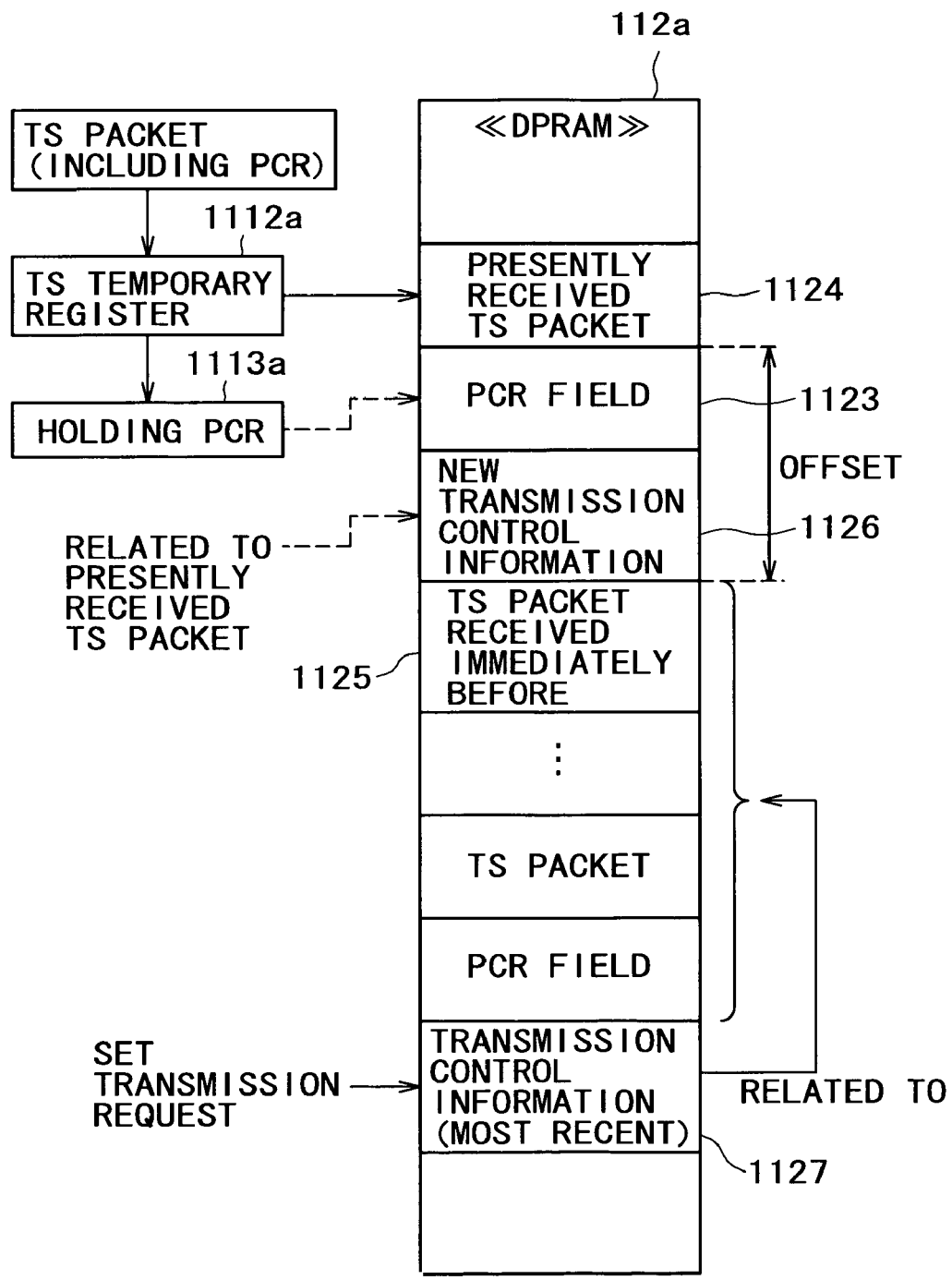
FIG. 19 is a diagram showing the state of data stored in the transmission buffer for the third write process.

In the third place, the third write process is explained. FIG. 18 shows a flowchart representing the processing procedure of the third write process. FIG. 19 is a diagram showing the status of an RTP packet set in the TS buffer 112a.

The third write process represented by the flowchart shown in FIG. 18 is activated if the received TS packet includes a PCR field and is not the first TS packet received since transmission control information was stored in the TS buffer 112a. That is to say, the third write process is activated in a state wherein a new RTP payload must be set by abiding by rule (1) described before.

The flowchart begins with a step S61 at which the received TS packet is stored in the TS buffer 112a. To be more specific, the received TS packet is stored in an area 1124 starting at an address obtained by adding an offset, which is equal to the sum of the length of a PCR field to be stored in an area 1123 in the TS buffer 112a and the length of transmission control information to be stored in an area 1126 in the TS buffer 112a, to the last address of an area 1125 for storing the immediately preceding TS packet. At that time, the value of the PCR field is stored in the PCR temporary register 1113a.

Then, at the next step S62, the value of the PCR field stored temporarily in the PCR temporary register 1113a is copied to the area 1123 reserved in the DPRAM serving as the TS buffer 112a as a portion of the offset added at the step S61, being allocated to the value of the PCR field.

Subsequently, at the next step S63, new transmission control information is stored in the area 1126 reserved in the TS buffer 112a as a portion of the offset added at the step S61, being allocated to the transmission control information.

Then, at the next step S64, the transmission request flag included in the transmission control information for the immediately preceding RTP payload is set.

In such a process, the received TS packet temporarily stored in the TS temporary register 1112a is copied to the area 1124 starting at an address obtained by adding the offset described above to the last address of the area 1125 for storing the immediately preceding TS packet as shown in FIG. 19. In addition, new transmission control information, which is associated with the value of the PCR field stored in the area 1123 and the received TS packet stored in the area 1124, is set in the area 1126. Finally, the transmission request flag included in transmission control information is set. The transmission control information has been stored in an area 1127 as transmission control information for the immediately preceding RTP payload.

Figure 20:
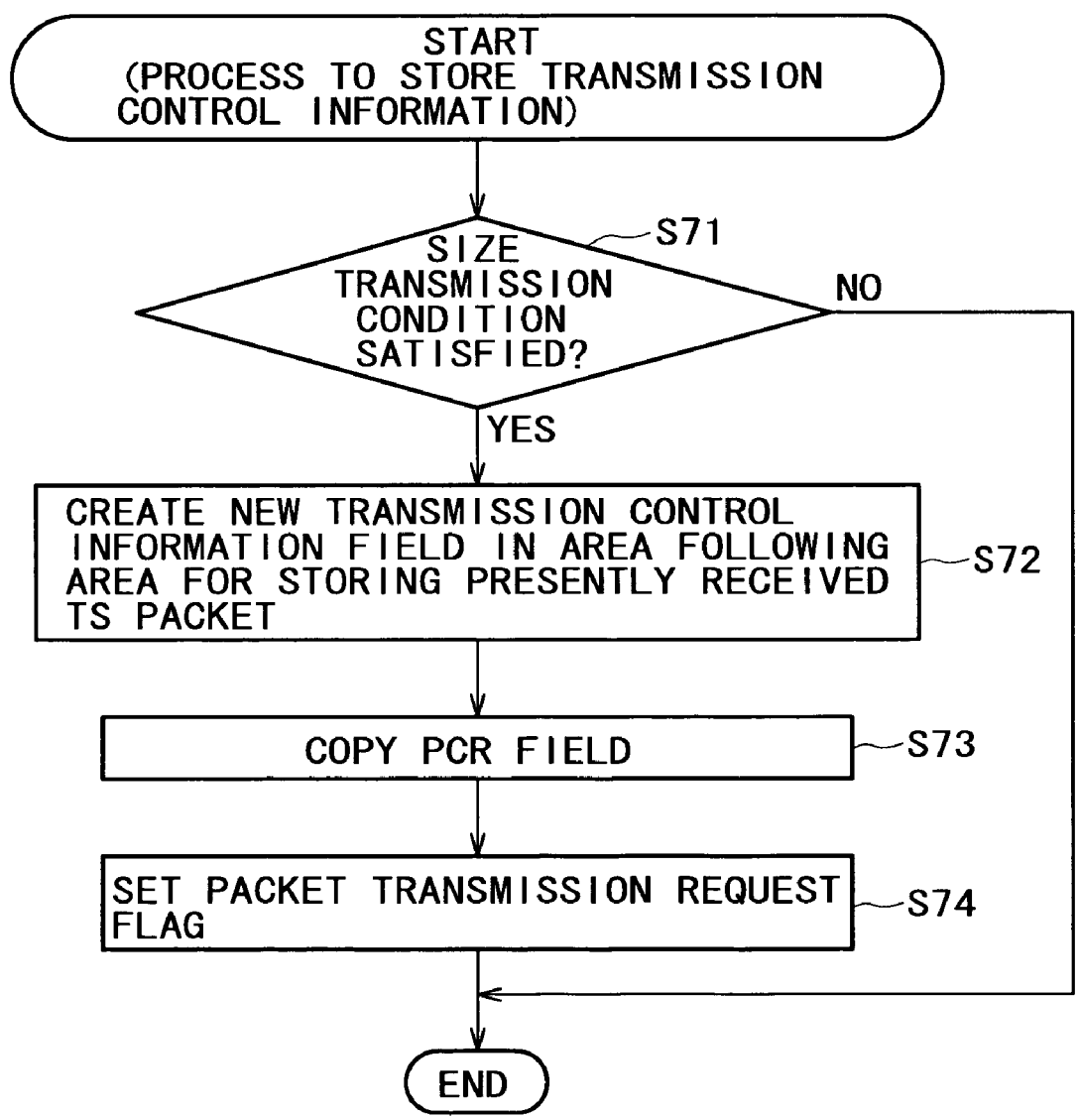
FIG. 20 shows a flowchart representing the processing procedure of a process to store transmission control information.
Figure 21:
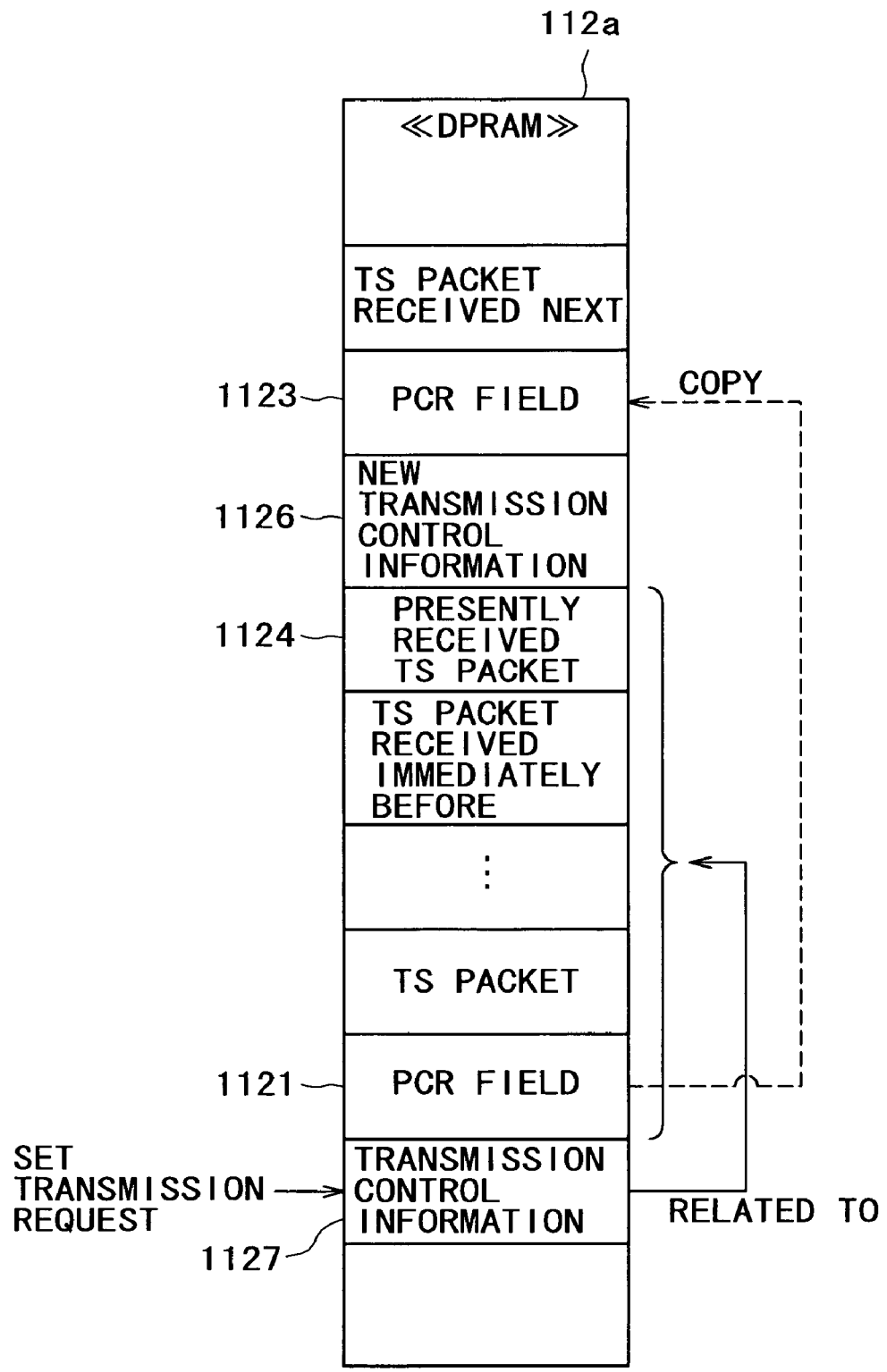
FIG. 21 is a diagram showing the status of information written into the transmission buffer in the process to store transmission control information.

Next, the process of storing transmission control information is explained. FIG. 20 shows a flowchart representing a processing procedure of the process, which is carried out at the step S07 of the flowchart shown in FIG. 13, to store transmission control information. FIG. 21 is a diagram showing the status of information written into the TS buffer 112a in the course of the process to store transmission control information.

As shown in the flowchart of FIG. 13, the process of storing transmission control information is activated after the first or second write process is completed.

The process of storing transmission control information begins with a step S71 at which the transmission control information is referenced to examine the size of the RTP packet in order to form a judgment as to whether or not the size satisfies a transmission condition. If the size of the RTP packet satisfies the transmission condition, the flow of the processing procedure goes on to a step S72. If the size of the RTP packet does not satisfy the transmission condition, on the other hand, the execution of the process of storing transmission control information is ended.

Then, at the next step S72, a new transmission control information field is created in an area 1126 following an area 1124 used for storing the presently received TS packet in the TS buffer 112a as shown in FIG. 21.

Subsequently, at the next step S73, a PCR field is created in an area 1123 following the area 1126 for the new transmission control information field in the TS buffer 112a as shown in FIG. 21.

Then, the flow of the processing procedure goes on to a step S74 at which a packet transmission request flag is set. The packet transmission request flag is included in transmission control information associated with an immediately preceding RTP packet, which encloses an immediately preceding RTP payload. The immediately preceding RTP payload includes a series of previously received TS packets ending with the presently received TS packet.

In such a process, when a transmission size is satisfied, transmission control information and a PCR field are provided in the areas 1126 and 1123 respectively, which follow an RTP payload ending with the presently received TS packet stored in the area 1124 as shown in FIG. 21. The PCR field is provided in the area 1123 by copying the immediately preceding PCR field stored in an area 1121. Then, as preparations for setting the next RTP payload are put in a state of completion, a packet transmission request flag included in transmission control information stored in an area 1127 is set.

Figure 22:
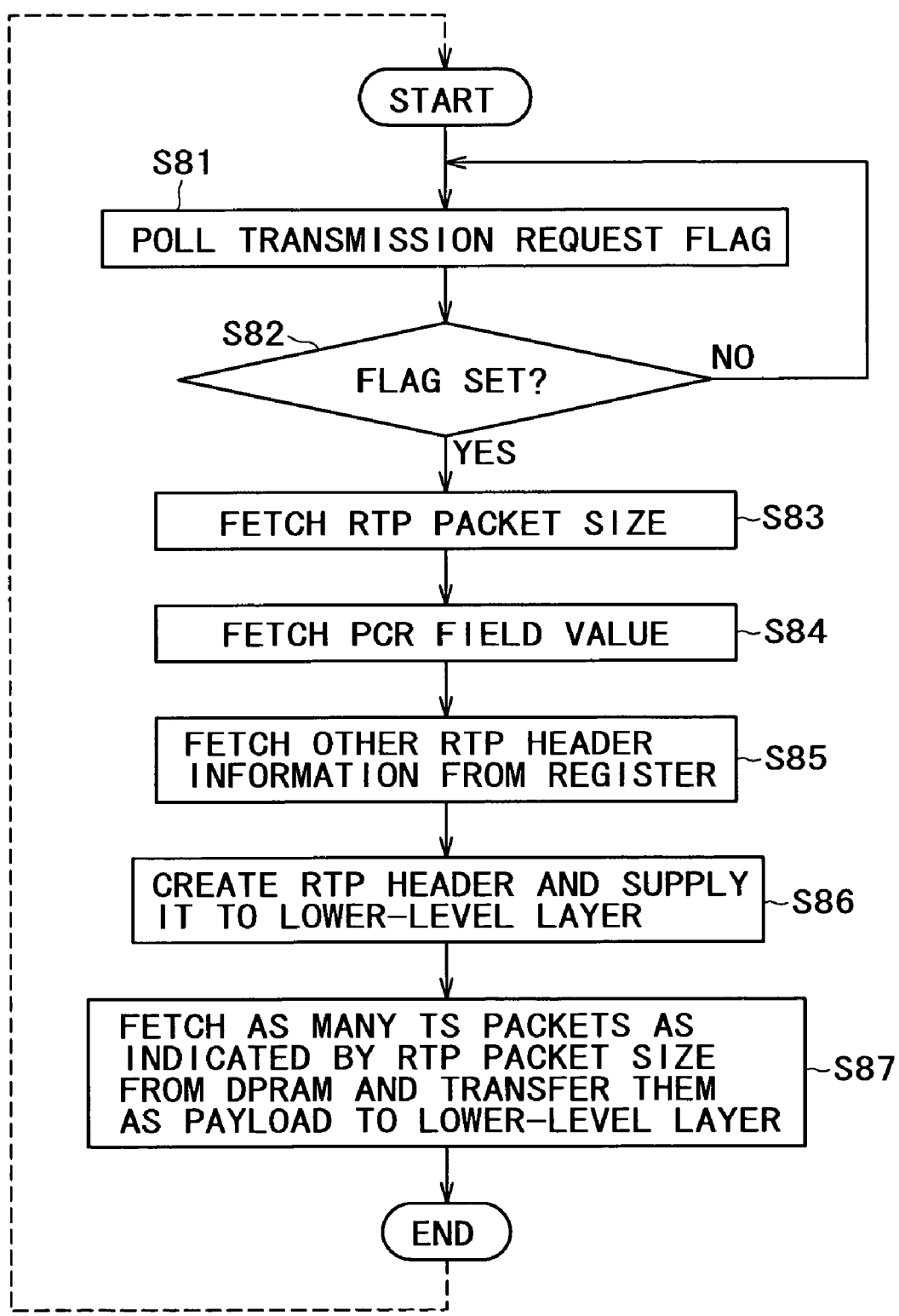
FIG. 22 shows a flowchart representing the processing procedure of a transmission process.
Figure 23:
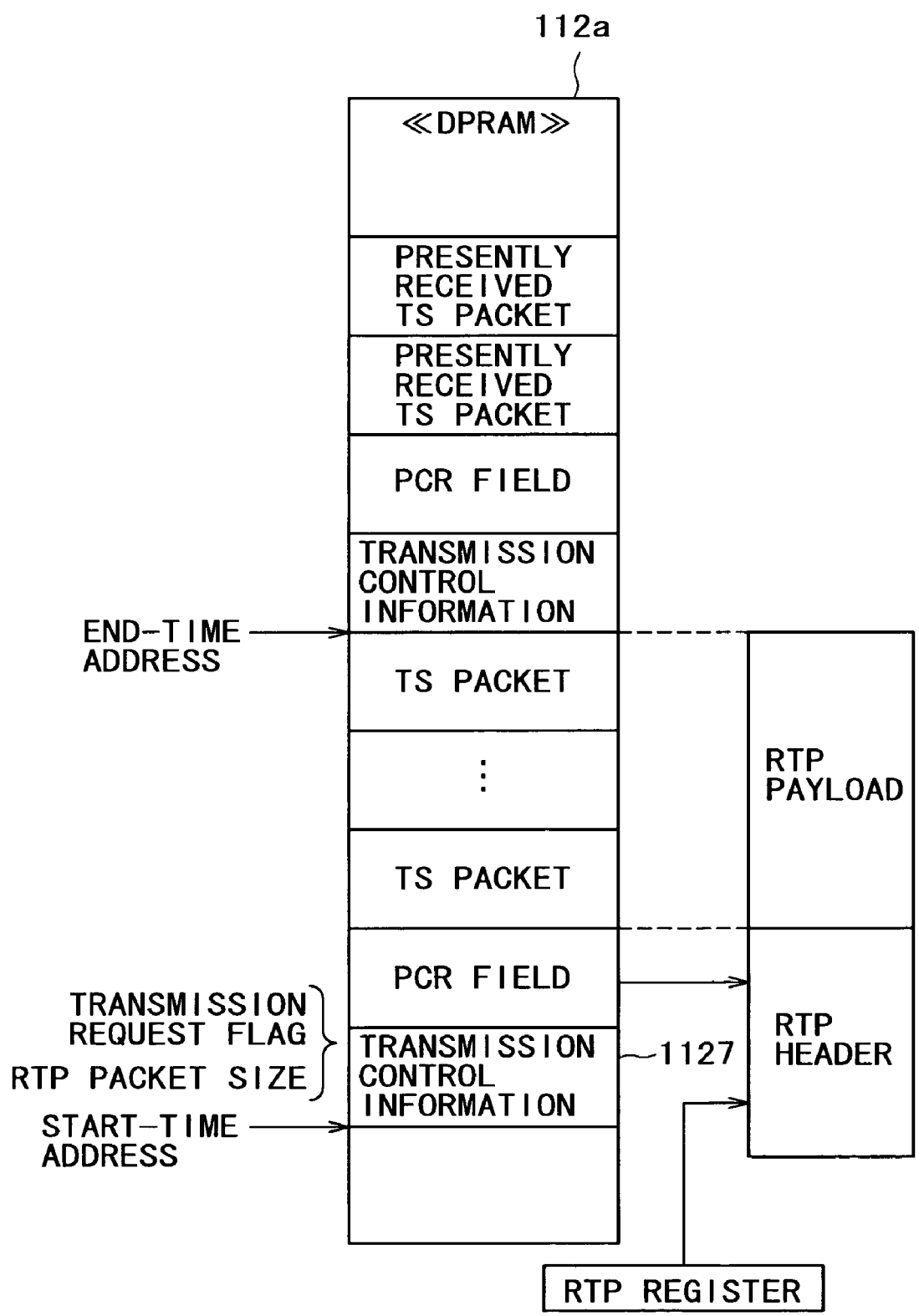
FIG. 23 is a diagram showing the state of the transmission buffer in the transmission process.

Next, a transmission process carried out by the packet synthesizer 1132 is explained. FIG. 22 shows a flowchart representing the processing procedure of the transmission process. FIG. 23 is a diagram showing the state of the TS buffer 112a in the transmission process.

The flowchart begins with a step S81 at which the packet transmission request flag included in transmission control information is polled at predetermined intervals. Then, the flow of the transmission process goes on to a step S82 to determine whether or not the packet transmission request flag has been set. If the packet transmission request flag has not been set, the flow of the transmission process goes back to the step S81 to repeat the polling operation. The packet transmission request flag is polled repeatedly till the flag is set. As the packet transmission request flag has been set, the flow of the transmission process goes on to a step S83.

At the step S83, the size of the RTP packet is fetched from the transmission control information. Then, at the next step S84, the value of the PCR field is read out. Subsequently, at the next step S85, other RTP header information is fetched from the RTP header register.

Then, at the next step S86, an RTP header is created and supplied to a layer at a lower level (i.e. the network device 330).

Subsequently, at the next step S87, the RTP packet having the RTP packet size is fetched from the TS buffer 112a and supplied to the layer at a lower level as an RTP payload. Then, the flow of the transmission process goes back to the step S81 to monitor the next packet transmission request flag.

As described above, transmission control information, the value of a PCR field and TS packets are set in the TS buffer 112a and, in dependence of the setting status, an RTP packet created on the basis of the transmission control information, the value of the PCR field and the TS packets is transferred to the layer at a lower level. The TS buffer 112a is typically implemented as a ring-shaped buffer. In such a process, the transmission control information is fetched from a start-time address in the ring-shaped buffer as shown in FIG. 23. If the packet transmission request flag included in the transmission control information has been set, indicating that a request for a transmission of an RTP packet has been made, an RTP header of the RTP packet is created by using the PCR field following the transmission control information. Then, TS packets stored in an area following the PCR field are read out and transferred to the layer at a lower level sequentially. As the operation to transfer the TS packets is finished, an address stored in a pointer register is set at a value pointing to an end-time address at which the next transmission control information is stored.

As described above, in the fifth embodiment, values of the PCR field and pieces of the transmission control information are not stored in registers. Thus, the number of such registers can be reduced, making it possible to provide a circuit with a compact size. In particular, it is not necessary to add the number of registers in use even if the number of TS packets to be enclosed in an RTP packet increases.

In addition, since a dual-port RAM is employed as the TS buffer 112a, the A/V data checker 111 serving as a functional block for generating an RTP packet can be divided into a codec-side block and a clock domain. Thus, a circuit such as a clock transfer unit is not required.

While preferred embodiments of the present invention have been described using specific terms, such description is for illustrative purposes only, and it is to be understood that changes and variations may be made without departing from the spirit or scope of the following claims.

What is claimed is:

1. A communication apparatus having a network device connected to a network to be used for outputting and receiving packets to and from said network, said communication apparatus comprising:

time measurement means for measuring a time on the basis of a clock signal having a predetermined frequency;

transmission process means for receiving information data from an application at a higher level, packetizing said information data, outputting the packet to said network by way of said network device and saving sender information including a transmission time of said packet, wherein said saved sender information remains saved after said packet is output to said network;

reception process means for receiving a predetermined packet from said network by way of said network device, generating receiver information including an arrival time of said packet by using said time measurement means, saving said receiver information, depacketizing said packet to obtain predetermined information data and outputting said predetermined information data to an application at a higher level; and data control means for controlling flows of said information data;

wherein said reception process means includes correction means for:

comparing transmission-time information included in a received packet as a transmission point of time measured for said packet by the time measurement means of the transmitting communication apparatus with time information showing a point of time measured as an arrival time of said packet by said time measurement means; and correcting said time measurement means so as to synchronize said time measurement means of a transmitting communication apparatus on the basis of said transmission-time information in case that a difference between said transmission point of time and said arrival time is beyond a predetermined range.

2. A communication apparatus according to claim 1 wherein said communication apparatus further comprising a management-packet process means for:

reading out said sender information saved in said transmission process means and said receiver information saved in said reception process means at predetermined transmission intervals;

generating a management-information packet based on said sender information and said receiver information;

transmitting said management-information packet to said network by way of said network device; and acquiring the management-information packet generated by another communication apparatus.

3. A communication apparatus according to claim 2, wherein said management-information packet is a Real-time Transport Control Protocol packet.

4. A communication apparatus according to claim 1 wherein said reception process means includes:
- storage means for storing time information showing a point of time measured by said time measurement means as a packet arrival time for each reception of a packet; and
- reception-state examination means for examining a state at a reception time by said time information, which is generated continuously.

5. A communication apparatus having a network device connected to a network to be used for outputting and receiving packets to and from said network, said communication apparatus comprising:
- time measurement means for measuring a time on the basis of a clock signal having a predetermined frequency;
- transmission process means for receiving information data from an application at a higher level, packetizing said information data, outputting the packet to said network by way of said network device and saving sender information including a transmission time of said packet, wherein said saved sender information remains saved after said packet is output to said network;
- reception process means for receiving a predetermined packet from said network by way of said network device, generating receiver information including an arrival time of said packet by using said time measurement means, saving said receiver information, depacketizing said packet to obtain predetermined information data and outputting said predetermined information data to an application at a higher level; and
- data control means for controlling flows of said information data;
- wherein said reception process means includes:
  - storage means for storing transmission-time information, which is included in a first packet received after initialization, as a transmission point of time measured for said packet by the time measurement means of the transmitting communication apparatus;
  - time-measurement start means for driving said time measurement means to start a measurement of time upon reception of said packet;
  - addition means for adding data of time information generated by said time measurement means as a result of said measurement to data of said transmission-time information stored in said storage means; and
  - time information generation means for generating time information synchronized with time information generated by said time measurement means of the transmitting communication apparatus.

6. A transmission apparatus having a network device connected to a network to be used for outputting a packet to said network, said transmission apparatus comprising:
- payload storage means for temporarily storing information data received from an application at a higher level as a payload of said packet;
- determination means for determining whether or not said information data received from said application at a higher level includes predetermined attached information to be attached to said packet;
- attached-information storage means for extracting said attached information from said information data received from said application at a higher level and temporarily keeping said attached information if said determination means determines that said information data received from said application at a higher level includes said attached information;
- control means for allocating an area in said payload storage means as an area to be used for storing said attached information if said determination means determines that said information data received from said application at a higher level includes said attached information; and
- attached-information write means for writing said attached information kept temporarily in said attached-information storage means into said area allocated by said control means as an area to be used for storing said attached information.

7. A transmission apparatus according to claim 6 wherein said control means:
- allocates an area in said payload storage means as an area to be used for storing transmission control information for controlling transmission of said packet stored in said payload storage means; and
- further has transmission control information write means for monitoring a result output by said determination means and a total amount of the information data stored in said payload storage means to determine whether or not a predetermined transmission condition is satisfied and writing information necessary for said transmission of said packet into said area allocated in said payload storage means as an area to be used for storing said transmission control information if said transmission condition is satisfied.

8. A transmission apparatus according to claim 7 wherein said transmission control information write means:
- writes transmission request information making a request for execution of said transmission of said packet into said payload storage means as said transmission control information if said transmission condition is satisfied; and
- further has transmission control means for monitoring said transmission control information to execute said transmission of said packet in accordance with said transmission control information if said request information for execution of said transmission of said packet is detected.

9. A communication apparatus having a network device connected to a network to be used for outputting and receiving packets to and from said network, said communication apparatus comprising:
- time measurement means for measuring a time on the basis of a clock signal having a predetermined frequency;
- transmission process means for receiving information data from an application at a higher level, packetizing said information data, outputting the packet to said network by way of said network device and saving sender information including a transmission time of said packet;
- reception process means for receiving a predetermined packet from said network by way of said network device, generating receiver information including an arrival time of said packet by using said time measurement means, saving said receiver information, depacketizing said packet to obtain predetermined information data and outputting said predetermined information data to an application at a higher level; and
- data control means for controlling flows of said information data; and
- a management-packet process means for:
  - reading out said sender information saved in said transmission process means and said receiver information saved in said reception process means at predetermined transmission intervals, generating a management-information packet based on said sender information and said receiver information, transmitting said management-information packet to said network by way of said network device, and acquiring the management-information packet generated by another communication apparatus;

wherein said management-information packet further comprises at least one of:
- a total number of packets transmitted by the communication apparatus;
- a total number of packets received by the communication apparatus;
- a total number of expected packets not received by the communication apparatus;
- information regarding an average value of jitters on said network; and
- information regarding fluctuations of jitters on said network.

10. A communication apparatus having a network device connected to a network to be used for outputting and receiving packets to and from said network, said communication apparatus comprising:

time measurement means for measuring a time on the basis of a clock signal having a predetermined frequency;

transmission process means for receiving information data from an application at a higher level, packetizing said information data, outputting the packet to said network by way of said network device and saving sender information including a transmission time of said packet;

reception process means for receiving a predetermined packet from said network by way of said network device, generating receiver informatiorf including an arrival time of said packet by using said time measurement means, saving said receiver information, depacketizing said packet to obtain predetermined information data and outputting said predetermined information data to an application at a higher level; and data control means for controlling flows of said information data, wherein said reception process means includes correction means for:
- comparing a sum of an average network delay and transmission-time information included in a received packet as a transmission point of time measured for said packet by the time measurement means of the transmitting communication apparatus with time information as measured by said time measurement means; and
- delaying the output of said predetermined information data to said application at a higher level until the sum of the average network delay and said transmission-time information equals the time information as measured by said time measurement means.

11. A communication apparatus having a network device connected to a network to be used for outputting and receiving packets to and from said network, said communication apparatus comprising:

time measurement means for measuring a time on the basis of a clock signal having a predetermined frequency;

transmission process means for receiving information data from an application at a higher level, packetizing said information data, outputting the packet to said network by way of said network device and saving sender information including a transmission time of said packet;

reception process means for receiving a predetermined packet from said network by way of said network device, generating receiver information including an arrival time of said packet by using said time measurement means, saving said receiver information, depacketizing said packet to obtain predetermined information data and outputting said predetermined information data to an application at a higher level; and data control means for controlling flows of said information data, wherein said reception process means includes:
- storage means for fixedly storing transmission-time information, which is included in a first packet received after initialization, as a transmission point of time measured for said packet by the time measurement means of the transmitting communication apparatus;
- time-measurement start means for driving said time measurement means to start a measurement of time upon reception of said packet;
- addition means for adding data of time information generated by said time measurement means as a result of said measurement to data of said transmission-time information fixedly stored in said storage means; and
- time information generation means for generating time information synchronized with time information generated by said time measurement means of the transmitting communication apparatus.

12. A communication apparatus having a network device connected to a network to be used for outputting and receiving packets to and from said network, said communication apparatus comprising:

time measurement means for measuring a time on the basis of a clock signal having a predetermined frequency;

transmission process means for receiving information data from an application at a higher level, packetizing said information data, outputting the packet to said network by way of said network device and saving sender information including a transmission time of said packet;

reception process means for receiving a predetermined packet from said network by way of said network device, generating receiver information including an arrival time of said packet by using said time measurement means, saving said receiver information, depacketizing said packet to obtain predetermined information data and outputting said predetermined information data to an application at a higher level; and data control means for controlling flows of said information data; and a management-packet process means for:
- reading out said sender information saved in said transmission process means and said receiver information saved in said reception process means at predetermined transmission intervals,
- generating a management-information packet based on said sender information and said receiver information, wherein said management-information packet comprises information regarding the status or performance of the network,
- transmitting said management-information packet to said network by way of said network device, and
- acquiring the management-information packet generated by another communication apparatus.

13. A communication apparatus according to claim 12, wherein said management-information packet is a Real-time Transport Control Protocol packet.

* * * * *